United States Patent [19]
Sheppard et al.

[11] Patent Number: 5,712,779
[45] Date of Patent: Jan. 27, 1998

[54] DC ELECTRICAL POWER SUPPLY SYSTEM

[75] Inventors: J. Steven Sheppard, Allen; Mark L. Barnett, Arlington; Guenter H. Lehmann, Rowlett; Arif Oguz, Arlington; Richard Vasquez, Mesquite, all of Tex.

[73] Assignee: Yuasa Exide, Inc., Reading, Pa.

[21] Appl. No.: 690,766

[22] Filed: Aug. 1, 1996

[51] Int. Cl.[6] .................................................. H02H 7/125
[52] U.S. Cl. .............................. 363/69; 363/52; 361/614
[58] Field of Search ................................. 363/52, 50, 84, 363/69; 361/605, 608, 614; 364/483

[56] References Cited

U.S. PATENT DOCUMENTS

| | | |
|---|---|---|
| 4,335,437 | 6/1982 | Wilson et al. ............................ 364/483 |
| 5,406,050 | 4/1995 | Macomber et al. ................... 219/130.1 |
| 5,576,941 | 11/1996 | Nguyen et al. ............................. 363/21 |

*Primary Examiner*—Peter S. Wong
*Assistant Examiner*—Shawn Riley
*Attorney, Agent, or Firm*—Akin, Gump, Strauss, Hauer & Feld, L.L.P.

[57] ABSTRACT

A DC electrical power supply system for converting AC power to DC power for various telecommunications equipment loads includes plural rectifiers mounted on one or more shelves and adapted to be inserted on and removed from said shelves, at will. One or more voltage converters may be inserted and removed from said shelves at will and include adapter plates for supporting the converters in place of a rectifier unit. The power supply system includes a frame supporting the shelves and a cabinet which includes busworks for connecting the rectifiers to circuit breaker tiers and to a battery pack. Low voltage disconnect devices may be interposed in the buswork at selected locations to provide operation in a battery protection mode, load protection mode and load shedding mode. The circuit breaker tiers, buswork, shelving, rectifier units and converters are all accessible for connection and disconnection from the front side of the power supply system. The power supply system includes digital microprocessor controls for controlling and monitoring system voltage, individual rectifier voltages, system and individual rectifier current output, status of each rectifier, converter circuit breaker and low voltage disconnect devices, as well as other operating parameters. Each rectifier unit may be controlled to provide staged current output or walkin during load startup or rapid increase.

49 Claims, 16 Drawing Sheets

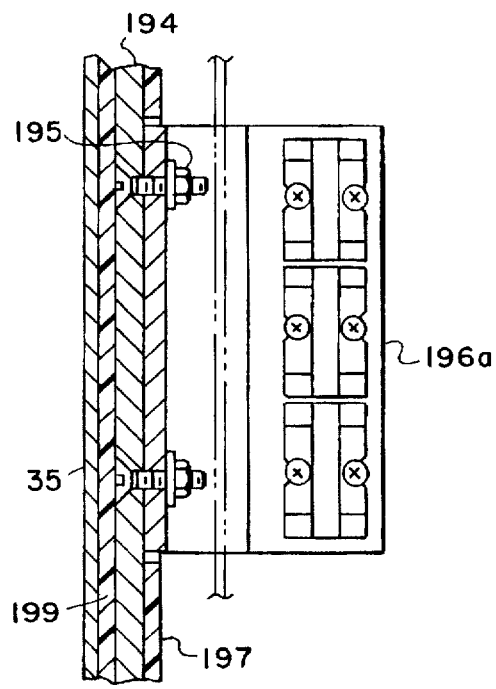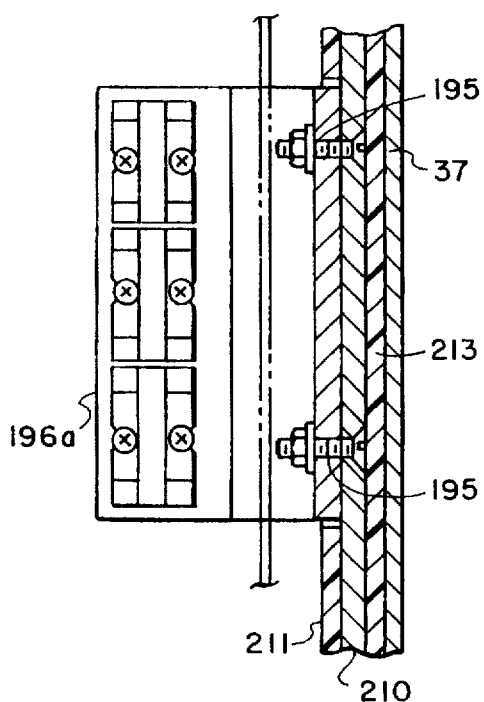
FIG. 8A  FIG. 8B
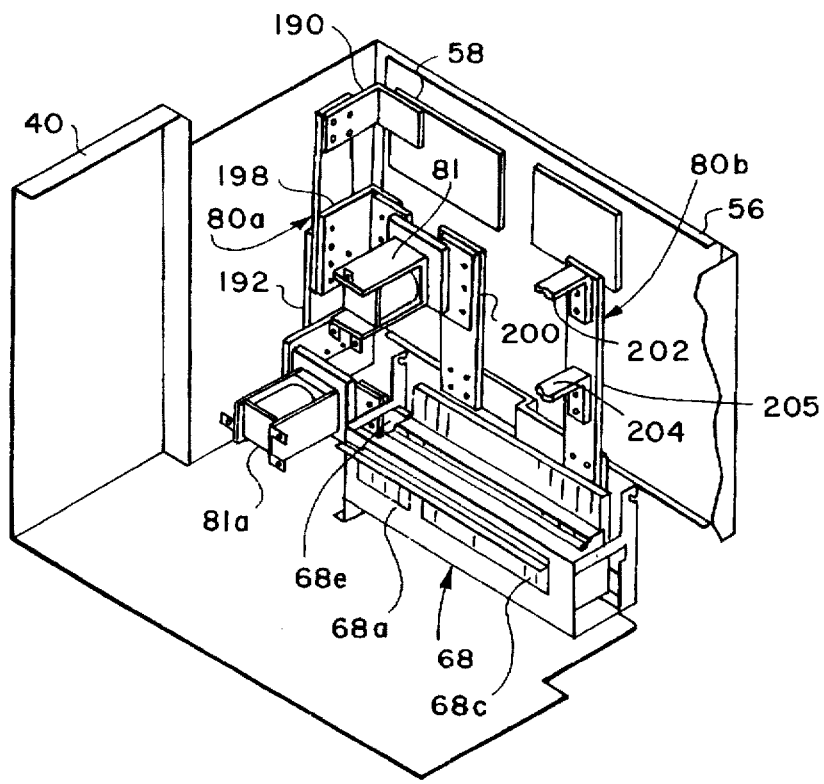
FIG. 8C

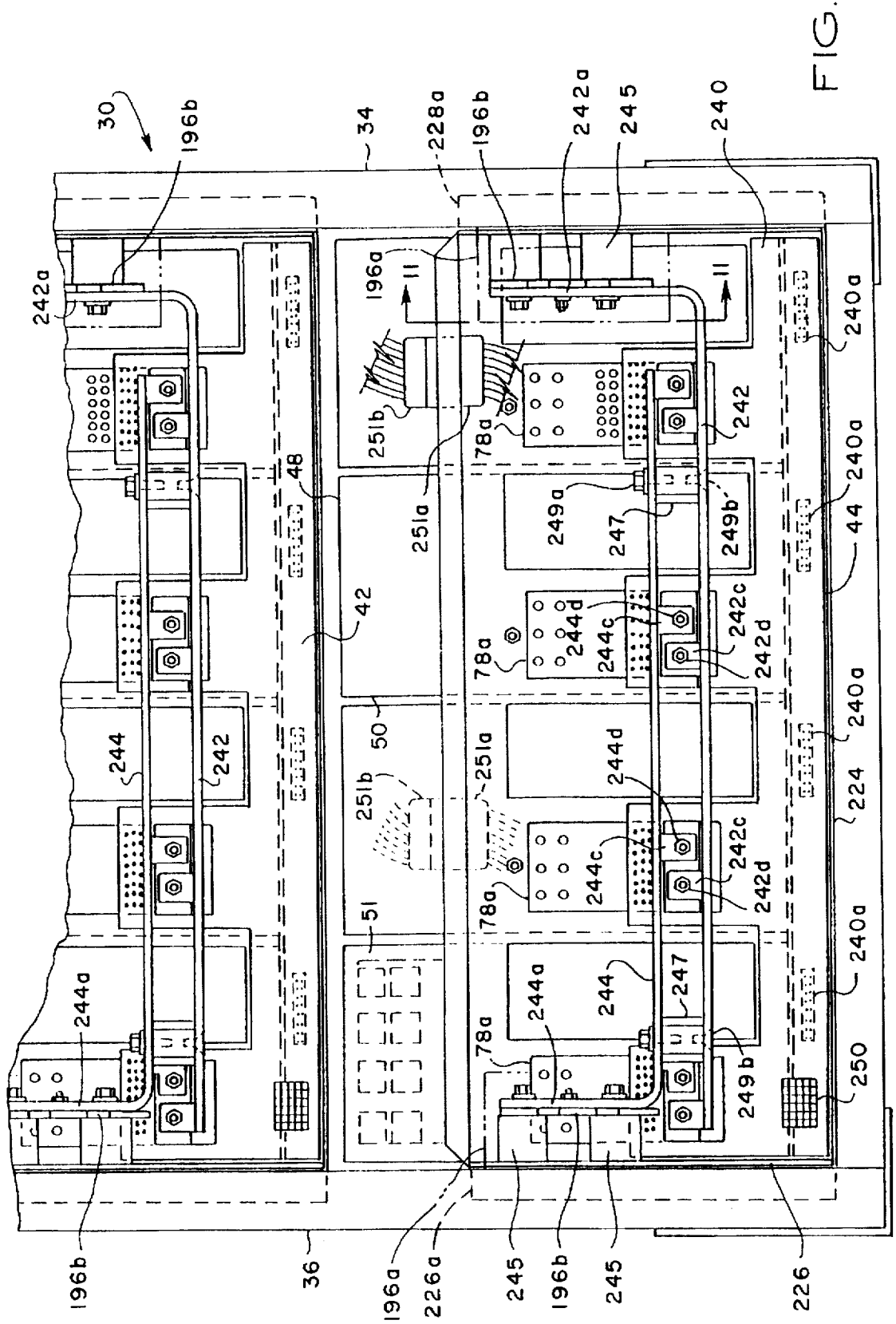

DC ELECTRICAL POWER SUPPLY SYSTEM

FIELD OF THE INVENTION

The present invention pertains to an automated direct current (DC) electrical power supply system, particularly adapted for supplying low voltage, DC power to telecommunications equipment by converting AC power or drawing on storage batteries in the event of AC power interruption.

BACKGROUND

A continuing proliferation of various types of telecommunications equipment, in particular, has pressed the need for reliable, low voltage direct current (DC) electrical power supply systems for operating such equipment at remote sites as well as in so-called central office installations. One particularly rapidly developing need for reliable DC electrical power supply systems is for radiotelephone systems, commonly known as cellular phone systems. Typical cellular telephone transmitting and receiving sites include a controlled environment enclosure or vault in which radio transmitters and receivers are installed and are interfaced with telephone land lines. The transmitter and receiver enclosures or vaults are also, of course, located in proximity to a signal transmitting and receiving antenna for the particular "cell" being served by the telephone system. Many of these signal transmitting and receiving sites also include microwave frequency range, telecommunications relay or transmitting and receiving stations and such sites are quite often located in remote, unpopulated and somewhat inaccessible geographical locations. The aforementioned telecommunications equipment, for the most part, operates on relatively low voltage DC electrical power in the range of plus 24 volt to minus 48 volt DC power, for example.

Since most locations for cellular telephone and similar telecommunication systems do not have DC power available, conventional single phase alternating current (AC) electrical power must be converted to DC power. Of course, it is also desirable and often necessary to provide a suitable bank of storage batteries to provide power to the essential communications equipment in the event of an interruption of the AC power being transmitted by the AC power grid.

With this background of need for reliable DC electrical power, there has also been a growing need for reliable systems which are operable to convert AC electrical power to DC power, capable of being highly automated and being monitored remotely and controlled remotely, including updating any control parameters governed by programs operating on electronic data processors. Still further, the above-mentioned applications for DC power supply systems have also made desirable the provision of DC electric power systems which are capable of expansion or contraction to provide power for equipment added or deleted after the initial installation of the telecommunications system. Other desiderata for such power supply systems include ease of adding rectifier units to or deleting rectifier units from the power supply system as power needs change, and converting DC power from one voltage to the other. This last mentioned desiderata is particularly important for sites which include cellular phone radio transmitters and receivers as well as transmitters and receivers which operate, for example, in the microwave frequency range of the radio frequency spectrum.

The aforementioned enclosures or vaults as well as other premises which utilize power supply systems of the general type mentioned herein are usually not particularly spacious and in this regard it is also desirable to be able to install, service and modify such power supply systems in such a way that system installation, servicing and replacement of components may be carried out from the front side of the system without moving the system frame or cabinet within the enclosure, since space available to do so may be limited or non-existent.

The above-mentioned conditions pertaining to installation and operation of DC electrical power supply systems, particularly for application in the telecommunications industry, have been substantially met by the present invention.

SUMMARY OF THE INVENTION

The present invention provides an improved DC electrical power supply system, particularly adapted for use in conjunction with telecommunications equipment and other equipment requiring reliable supply of low voltage DC power.

In accordance with one aspect of the present invention, a DC electrical power supply system is provided which provides unique structure for supporting one or more plug-in type rectifier units and including circuitry and controls for transmitting AC electrical power to the rectifier units, DC electrical power from the rectifier units and for supplying DC electrical power to a predetermined number of load circuits from rectifier and voltage converter units or from a battery bank in the event of interruption of AC electrical power to the rectifier units.

The power supply system of the present invention is also adapted to substitute one or more plug-in type DC voltage converter units in one or more receptacles of the power supply system which are also operable to receive and support a rectifier unit. The power supply system is thus particularly adapted to accommodate changes in the power requirements of the load circuits as additional equipment is added to or deleted from a telecommunications system, for example, and to accommodate changes in operating voltage requirements of certain portions of the telecommunications system.

A power supply system in accordance with the invention further includes a unique arrangement of shelving and receptacles for receiving one or more rectifier or voltage converter units, which shelving includes an advantageous arrangement of connectors for so-called "hot" plugging and unplugging of rectifier and converter units and the shelving itself may be easily mounted on or demounted from a frame for the power supply system. The system is advantageously arranged to include a power distribution and control component cabinet disposed above the modular shelves and supported by a frame for the power supply system.

In accordance with another aspect of the present invention, a power supply system is provided of the general type described herein wherein all control elements, fuse and circuit breakers and the rectifier and converter units are accessible from a so-called front side of the power supply system for convenience in operating and making modifications to the system. The power supply system includes a unique arrangement of bus linkage and mounting for plural circuit breakers for each DC load circuit connected to the power supply system. The bus linkage is conveniently arranged to be modified to include one or more low voltage disconnect devices which may be provided in such a way as to disconnect the power supply system from a battery bank, provide for a DC load protection arrangement or a load shedding arrangement. Moreover, the arrangement of the bus linkage and the support structure for the modular shelves is such that other equipment, not directly connected to the power supply system, may be mounted on the system frame and may be accessible to operating or servicing personnel in the same way that the rectifier and converter units are accessible from the front side of the system.

In accordance with another aspect of the invention, all of the AC and DC connections are prewired between the power distribution and control cabinet to the shelf positions of the rectifiers and DC converters.

The power supply system also includes a support structure for plural DC circuit breakers including a unique arrangement of a bus link and termination posts as well as a circuit breaker alarm termination board and connector element. The status of each circuit breaker may be communicated to the control system for on-site or remote monitoring.

The present invention also provides a control system for monitoring and adjusting voltages on the DC bus circuit and each individual rectifier and converter includes its own automatic control circuit conveniently mounted on the rectifier support shelving and pluggable into each rectifier as it is mounted in a shelf slot or receptacle. Alternatively, the individual rectifier and converter control circuits may be disposed in the respective rectifier and converter units. The control system is user programmable for temperature compensation, the system float voltage, voltage equalization and circuit breaker identification. The control system includes detection and correction features and data routing, transfer and storage features for complete immediate or long-term monitoring of the operation of essentially all components of the power supply system. No manual adjustment of rectifier or converter output is required. A unique current walk-in feature is provided for controlling acceptance of the load by the power source. Each controller for a rectifier or converter may operate independent of the master control system to maintain a set of predetermined operating parameters in the event of a master control system failure.

Additional control features include automatic overvoltage protection, monitoring of system voltage, system currents, individual current output by each rectifier and converter, battery current in both the charging and discharge mode of operation, monitoring and control of the low voltage disconnect devices, and monitoring of battery and ambient temperatures, with a view to minimizing the risk of battery thermal runaway. Still further, the control system is operable to remove a rectifier from the load circuit if currents are out of balance and restarting the rectifiers if momentary over-voltages result in a rectifier being latched out of the load circuit.

Another important aspect of the invention resides in the provision of a system which may be monitored and controlled remotely to the extent that the system may be installed in unmanned sites or at least the number of personnel working at a particular site, which may include other equipment, may be reduced. System operating faults may be detected through remotely monitored alarms indicating failures or eminent failures of system components.

Those skilled in the art will further appreciate the above-mentioned features and advantages of the invention together with other superior aspects thereof upon reading the detailed description which follows in conjunction with the drawing.

BRIEF DESCRIPTION OF THE DRAWING

FIG. 8A is a detail section view taken from the line 8A—8A of FIG. 8;

FIG. 8B is a detail section view taken from the line 8B—8B of FIG. 8;

FIG. 8C is a detail perspective view showing one arrangement of a low voltage disconnect device in the buswork;

FIG. 9 is a detail elevation of one of the rectifier support shelves taken generally from line 9—9 of FIG. 10;

DESCRIPTION OF THE PREFERRED EMBODIMENTS

Figure 1:
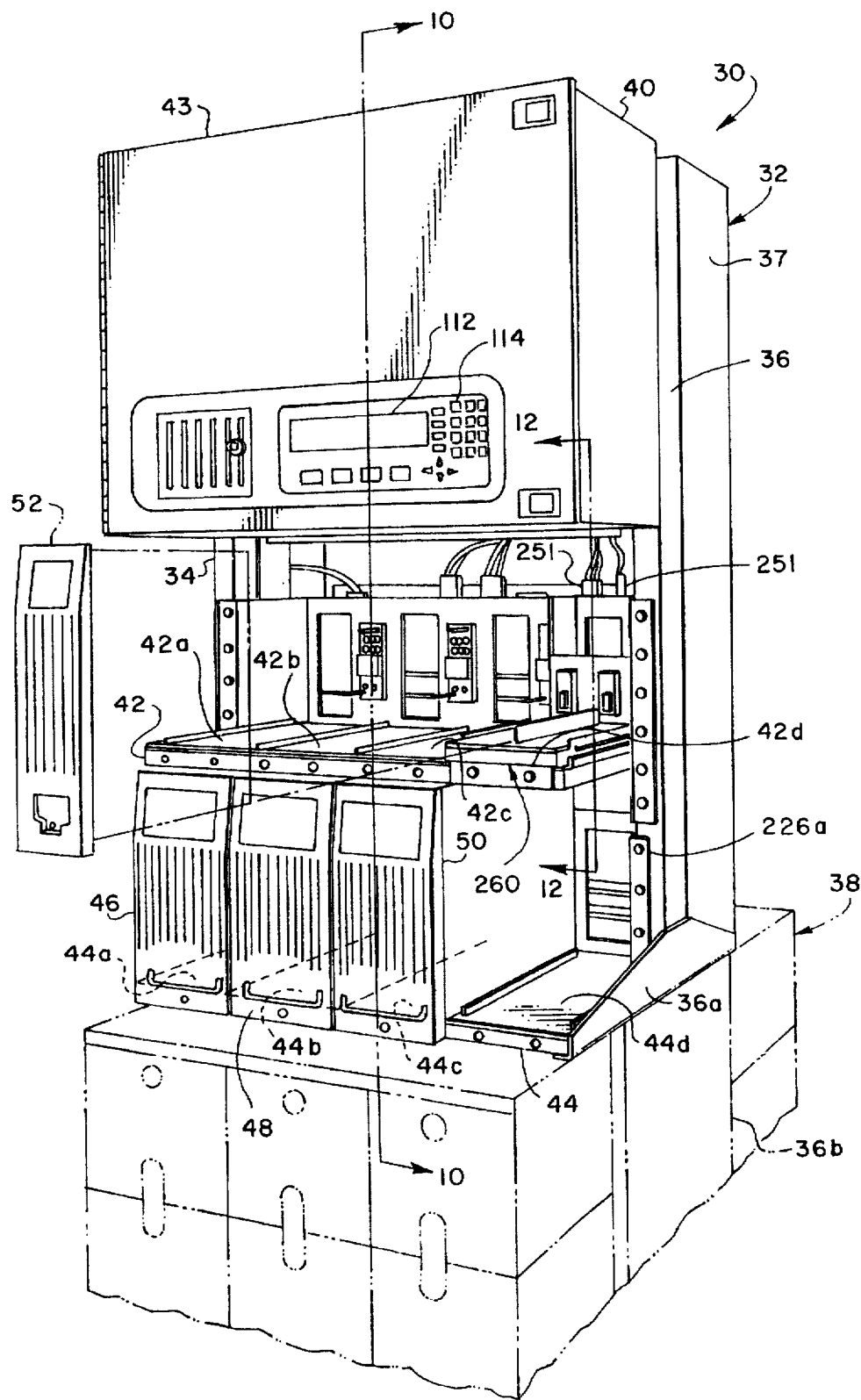
FIG. 1 is a perspective view of one embodiment of a power supply system in accordance with the invention.

In the description which follows like elements are marked throughout the specification and drawing with the same reference numerals, respectively. The drawing figures may not be to scale and certain elements may be shown in generalized or somewhat schematic form in the interest of clarity and conciseness.

Referring to FIG. 1, a power supply system in accordance with the invention is illustrated and generally designated by the numeral 30. The power supply system 30, in a preferred embodiment illustrated, is characterized by a frame 32 including two spaced apart upstanding column members 34 and 36 secured to transverse feet 34a and 36a and which column members are shown in a configuration such that these members or extensions thereof, such as member 36b shown, straddle a battery bank or pack 38 comprising a plurality of parallel connected twenty-four volt valve regulated storage batteries. Other frame configurations may be used within the scope of the invention and the battery pack 38 is not required to be mounted below the system 30. The power supply system 30 includes a generally rectangular box-like cabinet 40, mounted generally at the top of frame 32 and two spaced apart shelves 42 and 44 which are adapted to support plural removable AC to DC rectifier units 46, 48 and 50, for example, as well as one or more DC voltage converter units 52, one shown by way of example.

Each of the rectifier units and converter units is adapted to be inserted in and removed from suitable shelf receptacles 42a, 42b, 42c and 42d or 44a, 44b, 44c, or 44d. Accordingly, each rectifier unit and each converter unit may be easily added to or removed from the power supply system or relocated on the shelving of the power supply system, at will. Each of the rectifiers 46, 48 and 50 may be a high frequency switch mode type, for example. In like manner, the voltage converters 52 may also be of the high frequency switch mode type.

The power supply system 30 is adapted to provide a source of DC power from an AC utility transmission system, not shown, or from the battery pack or bank 38 or additional battery packs, not shown. Under normal operating conditions, DC power is provided from the rectifiers 46, 48 and 50 which are usually configured in an n plus one (n+1) configuration for redundancy while maintaining the batteries at a recommended float voltage. During a loss of AC power, the batteries of bank 38 discharge to provide DC power directly to DC power consuming devices or "loads", not shown, connected to the power supply system 30.

Figure 2:
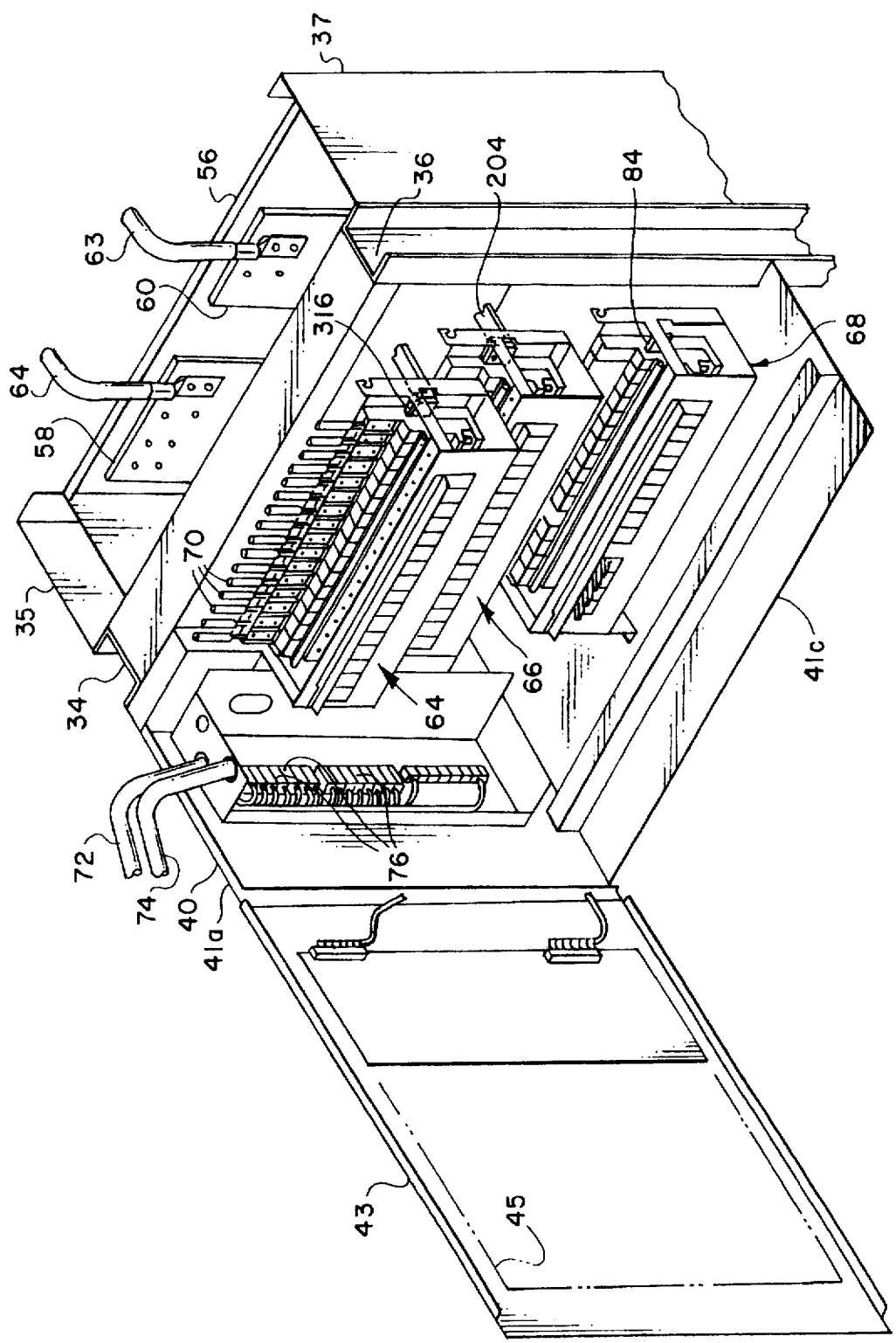
FIG. 2 is a partial perspective view of the power distribution and control cabinet of the power supply system shown in FIG. 1.

Referring to FIG. 2, a portion of the cabinet 40 is shown including a rear support plate 56 for supporting a link 58 for a common DC bus and a link 60 for a ground plate, not shown in FIG. 2. Cables 62 and 63 are shown connected to the links 58 and 60 and are suitably connected to the battery pack 38 shown in FIG. 1. The cabinet 40 also supports plural tiers of circuit breakers, each tier designated by the numerals 64, 66 and 68, respectively. The circuit breaker tiers 64 and 66 are adapted to be connected to the aforementioned DC bus and to respective loads as indicated by the cables 70 which are connected to respective ones of the circuit breakers of tier 64 in a manner to be explained in further detail herein. The circuit breaker tier 66 is also adapted to include plural circuit breakers and load connections also to be described in further detail herein. The circuit breaker tier 68 includes plural circuit breakers and connections for connecting rectifiers to the converter or converters 52 and for connecting respective DC loads to the converters.

The cabinet 40 includes opposed forward sidewalls 41a and 41b, the latter not shown in FIG. 2, a bottom wall 41c and a front door 43 suitably hinged to the sidewall 41a and providing support for a master controller backplane or support panel, generally designated by the numeral 45. Cabinet 40 is open across its top for entry and exit of AC and DC conductors to be described further herein. Suitable conductor means 72 and 74 from an AC power distribution grid or other source, not shown, are connected to a suitable bus, not shown in FIG. 2, for connecting requisite AC circuits to the bus by way of plural connector means 76, as shown generally in FIG. 2. The power supply system 30 is particularly configured to accept AC power at forty-seven to sixty-four hertz single phase 180 volt to 260 volt nominal operating characteristics. The circuit breaker tiers 64 and 66 are adapted to contain respective rows of circuit breaker positions which permit inserting plural, plug-in circuit breakers for plus twenty-four to forty-eight volt DC nominal load circuits and circuit breaker tier 68 is provided with the same features for the minus forty-eight volt DC load circuits.

Figure 3:
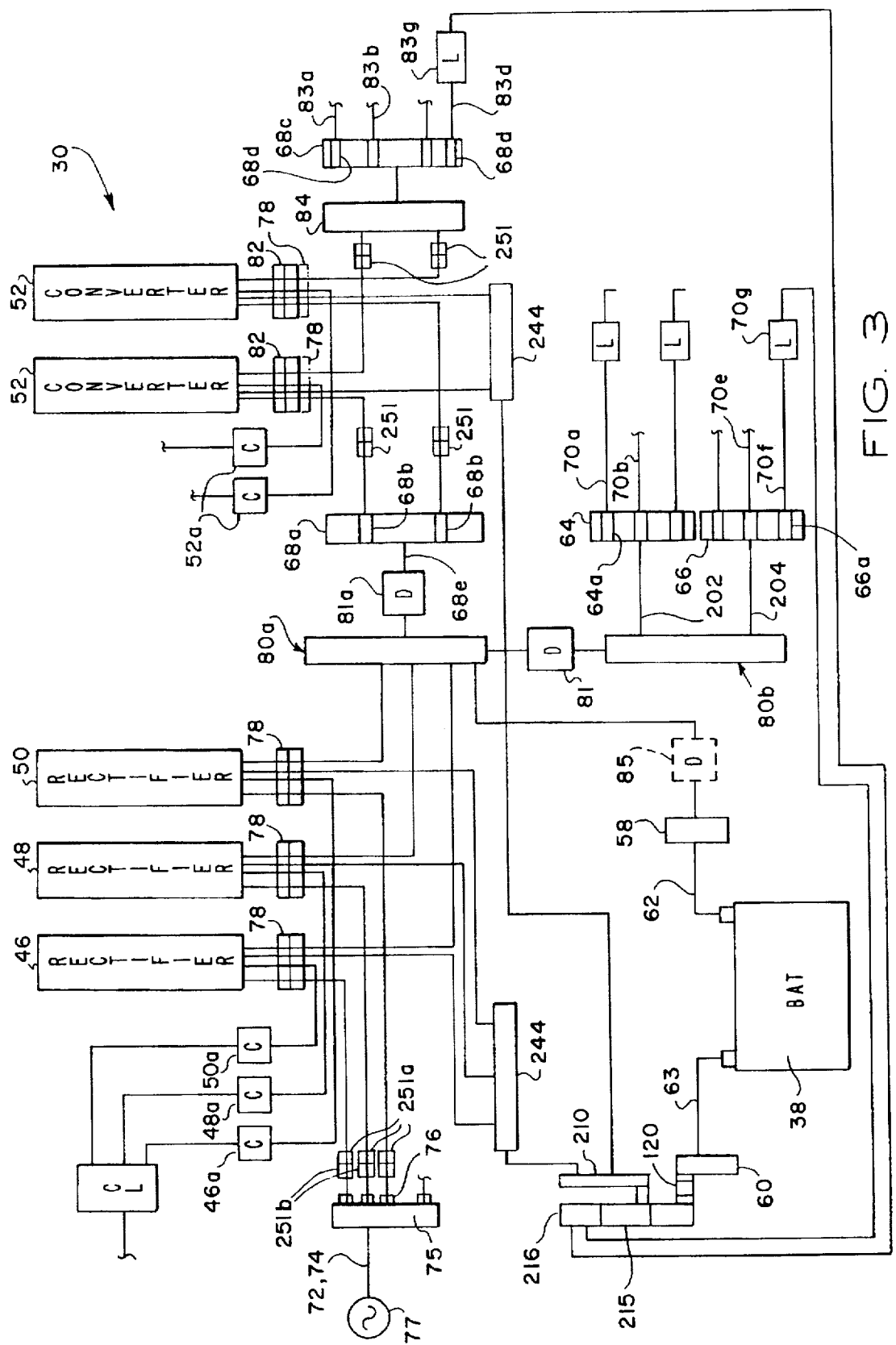
FIG. 3 is a generalized, schematic diagram of the power supply system.

Referring briefly to FIG. 3, a basic diagram of the power supply system 30 is illustrated showing the major components, such as the rectifiers 46, 48 and 50, for example. The rectifiers receive AC power through an AC distribution bus 75 which is connected via conductors 72, 74 to a suitable source 77 of AC power. The rectifiers 46, 48 and 50 are adapted to be releasably connected to the respective connector devices 76 for receiving AC input power and for delivering twenty-four volt DC power to a DC power bus 80. The DC power bus 80 is shown in two sections 80a and 80b having a low voltage disconnect device 81 interposed therebetween. A second low voltage disconnect device 81a is shown interposed between section 80a of the DC power bus and a bus section 68a of circuit breaker tier 68. Suitable circuit breakers 68b are interposed in circuit breaker tier 68 and are connected by way of connectors 82 to respective DC voltage converters 52 for converting, for example, the plus twenty-four volt DC power on the bus 80 to minus forty-eight volt output power to a common bus 84. The minus forty-eight volt DC bus 84 is suitably connected to a second portion of the circuit breaker tier 68, indicated by numeral 68c and having suitable circuit breakers 68d supported thereon for connection to DC loads via cables 83a and 83b, for example.

FIG. 3 further shows the battery pack 38 operably connected to section 80a of the DC power bus 80 by way of the link 58 and a third low voltage disconnect device 85 interposed between the battery pack or bank 38 and the bus section 80a. The circuit breaker tiers 64 and 66 are shown connected to respective load cables 70a, 70b and so on by way of respective circuit breakers 64a and 66a, as indicated.

The low voltage disconnect devices 81, 81a and 85 have adjustable remotely controllable means for actuating to open the circuit at the points indicated and the devices may be of a type commercially available, such as a Model JCA-4023E made by Prestolite Electric, Inc. of Ann Arbor, Mich. Typically, the power supply system 30 is provided with low voltage disconnect devices which provide for battery protection, load protection or load shedding. For example, if the system utilizes only the low voltage disconnect device 85 in series with the battery pack 38, if battery voltage drops below a preset threshold, the device 85 operates to disconnect the batteries to protect them from possible deep discharge damage. Alternatively, the system 30 may utilize only the low voltage disconnect device 81 which is the load protection mode configuration of the system. This load protection mode connects the output of the rectifiers 46, 48 and 50 in circuit with the battery pack 38 and places the device 81 in series with the twenty-four volt DC loads connected to cables 70a through 70f, for example. Upon restoration of AC power, for example, a controlled slow rise time of the output current of the rectifiers 46, 48 and 50 is applied to charging the battery pack 38. When battery voltage rises to an acceptable level, the disconnect device 81 is closed to apply power to the DC loads via cables 70a, 70b and so on to prevent damage to loads resulting from a low voltage applied directly thereto. The resulting high currents imposed on the loads, could also cause the circuit breaker 64a and 66a to undergo unwanted opening.

A third mode of operation of the disconnect devices is known as load shedding wherein disconnect device 85 is omitted, battery pack 38 is connected directly to bus section 80a and the disconnect devices 81 and 81a are maintained in the system circuit according to the diagram shown in FIG. 3, that is, disconnect device 81 is in series with the twenty-four volt DC load bus section 80b connected to the DC loads via cables 70a, 70b and so on. Disconnect device 81a is interposed between the bus 80 and the convecters 52. Operation of the system with devices 81 and 81a interposed between the battery pack 38 and the loads connected to the bus 80 typically will be such that device 81 will be set to disconnect DC loads connected to cables 70a, 70b and so on while device 81a remains connected to the battery pack 38 to be used to power critical equipment loads connected to the DC converters 52. Just prior to total battery discharge, device 81a is disconnected to protect the battery 38. Depending on the criticality of the loads connected to the converters 52 as compared to the loads connected to cables 70a, 70b and so on, the device 81a may be set to disconnect at a higher voltage than the device 81, if desired.

FIG. 3 further illustrates individual controllers 46a, 48a and 50a for each of the rectifiers 46, 48 and 50, respectively. The controllers 46a, 48a and 50a are mounted remote from the rectifiers themselves and are connected to the rectifiers through the connectors 78, as indicated in FIG. 3. However, the controllers 46a, 48a and 50a may be mounted in the rectifier units 46, 48 and 50, respectively. The controllers 46a, 48a and 50a are also connected to a communications circuit or communications link which is operably connected to a master control circuit to be described in further detail herein. In fact, a controller such as one of the controllers 46a, 48a and 50a is provided for each slot or rectifier receptacle 42a through 42d and 44a through 44d in the shelves 42 and 44, respectively. Typically, the controller for each rectifier is mounted below the rectifier support surfaces for the shelves 42 and 44 and is hard wired to the connectors 78, respectively, so that when a rectifier is inserted in a shelf receptacle, it is automatically connected to a controller and to the master controller. Each of the converters 52 also includes its own controller 52a, as indicated in FIG. 3, suitably connected to the converter through a connector 82. Exemplary power consuming devices 70g and 83g are shown in the circuit diagram of FIG. 3, by way of example.

Figure 4:
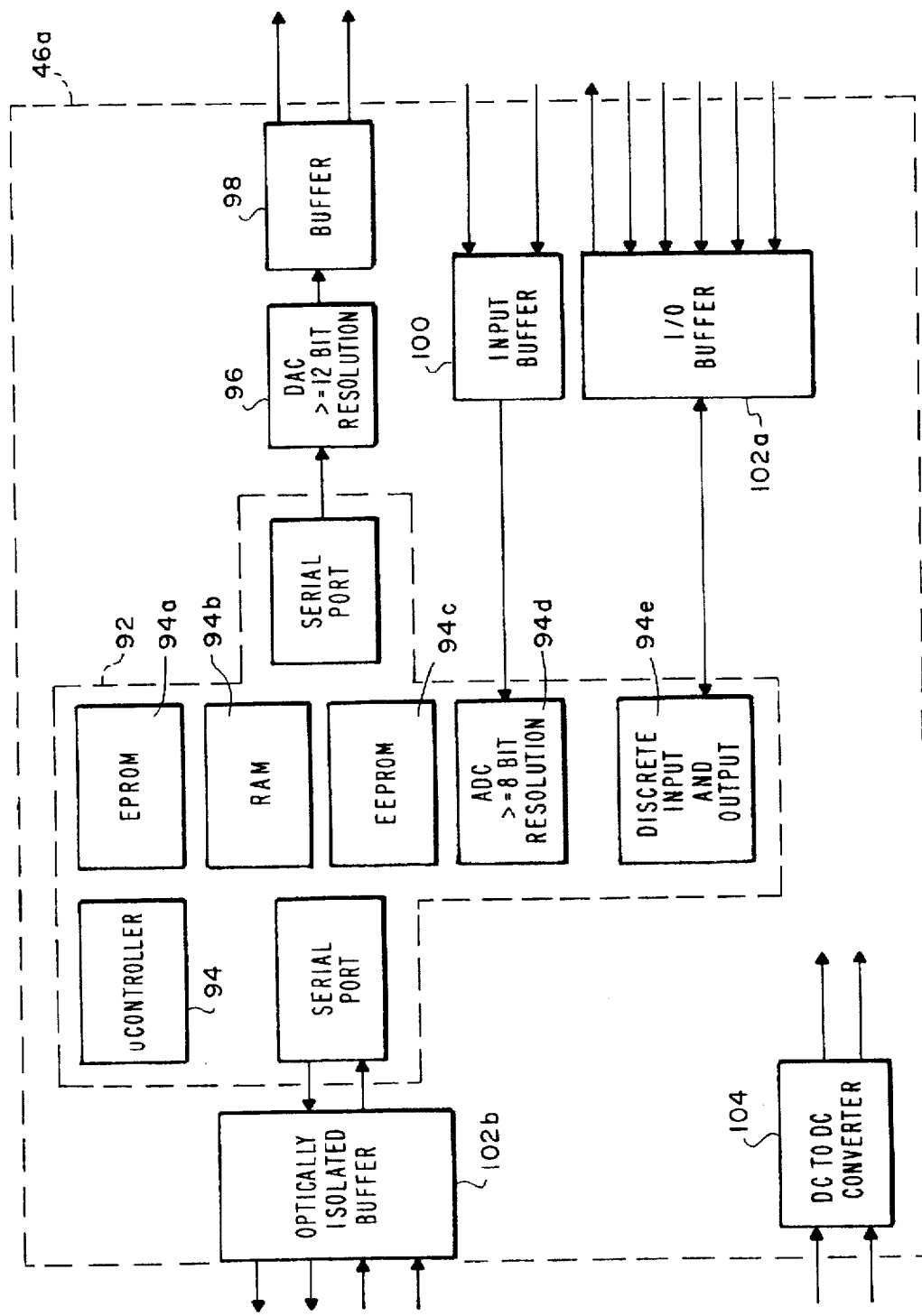
FIG. 4 is a rectifier controller block diagram.

Referring now to FIG. 4, a block diagram is illustrated showing the essential components of one of the rectifier controllers, such as the controller 46a. The other rectifier controllers and the converter controllers contain essentially the same elements. The controller 46a includes a microprocessor unit 92 including a suitable microcontroller circuit 94 and memory circuits 94a, 94b and 94c, as indicated. An analog to digital converter circuit 94d and discrete input and output circuit 94e are each also part of the microprocessor 92. The microprocessor 92 is also connected to a digital to analog converter 96 and a buffer 98 interconnected to a suitable voltage control circuit in the rectifier 46 itself and not shown in FIG. 4.

The controller 46a further includes an input buffer 100 connected to the analog to digital converter 94d and an input/output buffer 102a for controlling the flow of signals to and from the rectifier pertaining to control of current output of the rectifier, the condition of the rectifier cooling fan, an output overvoltage condition and the characteristics of the AC power input to the rectifier. The buffer 100 is operable to transmit signals regarding current flow from the rectifier.

The controller 46a as well as the controllers 48a, 50a and 52a are each interconnected to a master controller, to be described further hereinbelow, by way of a suitable optically isolated buffer 102b, as shown in FIG. 4. The controller 46a as well as the other controllers mentioned herein also include suitable DC to DC converters such as the converter 104 to provide the requisite operating voltages for the controller and elements connected thereto. Each rectifier 46, 48 and 50, for example, includes a suitable voltage sensor and current sensor, not shown, operably connected to the buffers 102a and 100, respectively. Voltage control of each rectifier is carried out by controlling an analog signal transmitted from the microcontroller 92 through buffer 98. Each rectifier 46, 48 and 50, for example, also has a suitable switch interposed in the rectifier output circuit to interrupt DC current output from a rectifier whose control parameters have varied from predetermined limits.

Moreover, each microcontroller 92 is also operable via a master controller to control the voltage output of each rectifier in a continuous fashion in small increments. Each controller 92 is also operable to provide system over-voltage protection by shutting off the associated rectifier at a predetermined output voltage and, after a predetermined number of rectifier restart attempts, a rectifier is latched out of the system circuit if the rectifier output voltage continues to exceed a predetermined amount. Each controller 92 is operable to be programmed to perform the aforementioned control functions automatically. However, the parameters of each control function may be changed by the aforementioned master controller through the buffer 102b by appropriate input signals from the master controller. If the system or master controller fails, however, each individual controller 46a, 48a, 50a, for example, is operable to continue operating in a so-called open loop manner to maintain the control parameters and no manual control of any rectifier or converter is required during operation of the system 30.

Another advantage of the system 30 resides in the provision for causing the rectifiers to sequentially begin generating current output. For example, each microcontroller 92 may be operated to increase the rectifier output voltage of its associated rectifier at a predetermined time whereby the total system current output is increased in a generally stepwise fashion with time as each rectifier is brought "on-line". For example, rectifier 46 may be operated by its microcontroller 92 to increase its voltage in a continuous fashion, in small increments, until it is at 100% load output followed by the same incremental or ramping up of voltage output by rectifier 48 and then followed by the same mode of operation of rectifier 50. In this way, current output of the system 30 may be increased from essentially zero to 100% in a predetermined time, somewhat incrementally, by enabling the rectifiers, respectively, to start producing current after a predetermined time delay so that a somewhat continuous increase in current output is obtained.

Figure 5A:
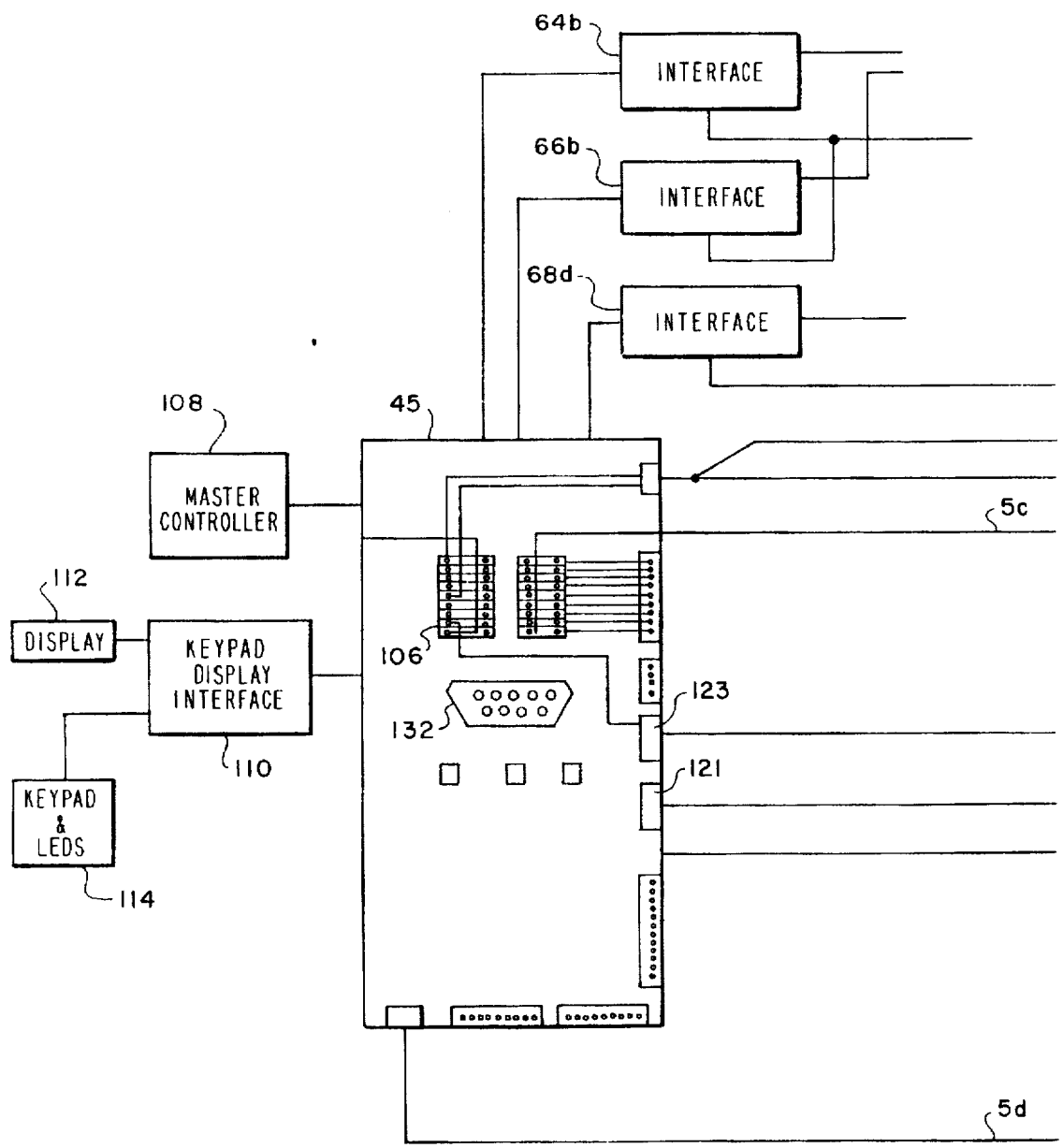
FIGS. 5A and 5B comprise a diagram showing the major components of a control system for the power supply system.
Figure 5B:
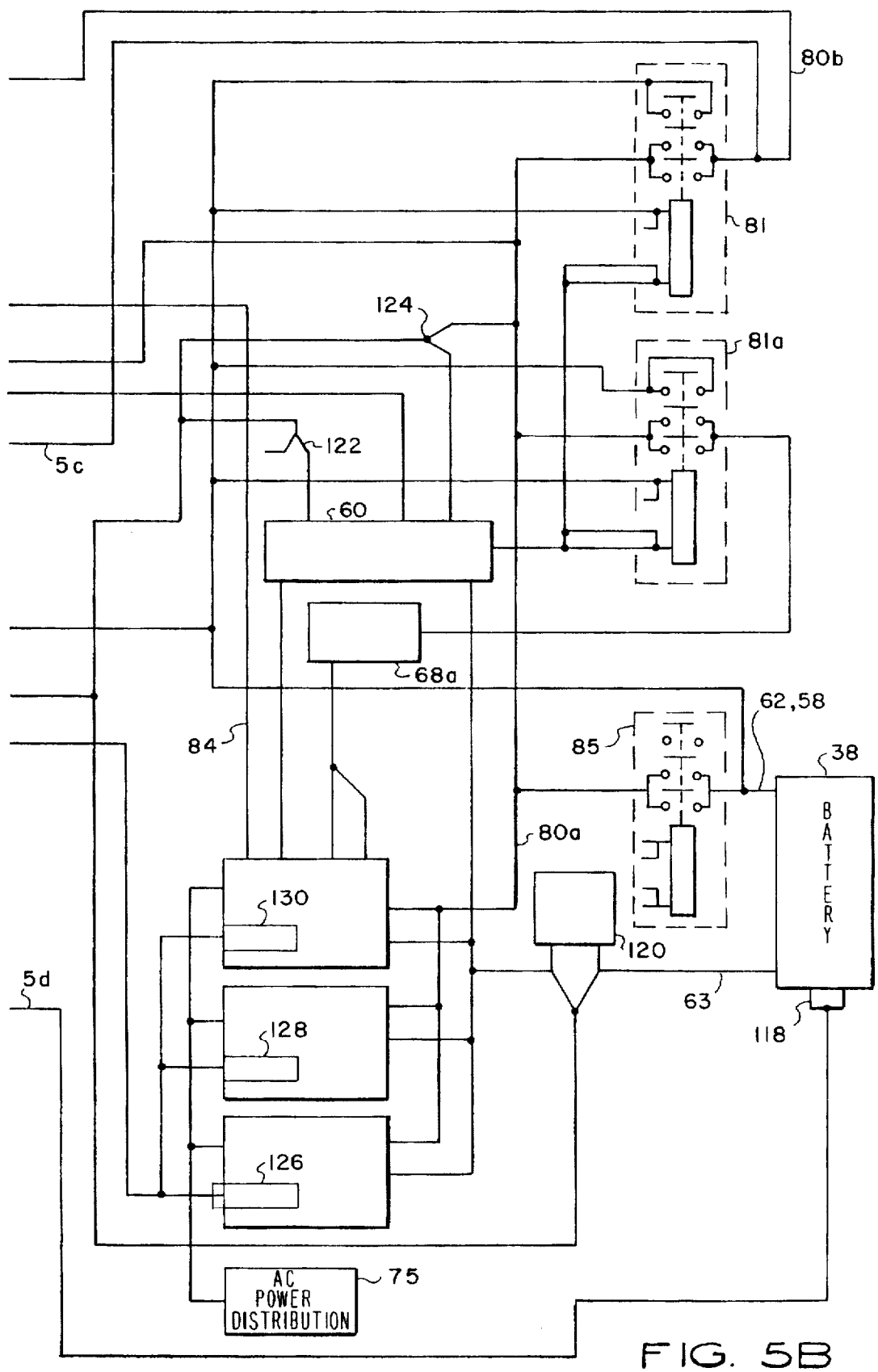

Referring now to FIGS. 5A and 5B, a DC circuit and schematic diagram is shown which includes major components of the DC electrical circuitry and certain ones of the components illustrated in FIG. 3. FIGS. 5A and 5B are intended to be read together when circuit lines 5c and 5d are aligned, respectively, together with all diagram lines therebetween. The system interface backplane 45 includes an appropriate array of fuse holders 106 for connecting control circuits to a main controller 108. The main controller 108 will be described in further detail in conjunction with FIG. 6. The controller backplane 45 also includes a suitable connector link for an interface 110 between a visual display unit 112 and a keypad 114. The keypad 114 is operable to make signal inputs to review certain system operating and control parameters capable of being viewed on the display 112 as well as to make changes in the operation of the master controller 108. The system interface backplane 45 is provided with suitable connector means for the aforementioned connections thereto as well as the following elements.

The battery bank or pack 38 includes a temperature sensor 118 suitably positioned in the center of mass of the battery pack and operably connected to the interface backplane 45 via conductor means 5d, as shown. Battery current is measured across a shunt 120 interposed between the battery ground cable 64 and ground plate 60, as shown. Shunt 120 is suitably connected to the interface backplane 45. Converter voltages are measured between ground plate 60 and bus link 84 at 122, as indicated, and transmitted by a two-wire twisted pair to multiconductor connector 121. System voltages are measured across the bus 80a and the ground plate 60 at 124 and communicated to master controller backplane 45 by a two-wire twisted pair also via the connector 121. Low voltage disconnect devices 85, 81 and 81a, depending on which ones are used, are wired to the master controller backplane 45 to indicate their status by way of suitable conductor means also in communication with circuitry on the system backplane by a connector 123.

The status of each circuit breaker in the circuit breaker tiers 64, 66, 68a and 68c is communicated to the backplane 45 by way of interface circuits 64b, 66b and 68d. Each circuit breaker has a status (open or closed) indicator switch operably associated therewith and operable to transmit a suitable signal by way of the interfaces 64b, 66b and 68d to the master controller 108 via backplane 45 to indicate when a breaker has tripped, for example. Alternatively, the circuit breakers could be replaced by fuses, for example, with similar status indicator means. Certain details of the connections between each circuit breaker and the interface circuitry for the circuit breaker tiers will be described in further detail herein.

Since the main controller 108 is operable to control and monitor the controllers 46a, 48a, 50a and 52a, respectively, each of the shelves, such as the shelves 42 and 44, have a backplane circuit which is operable to communicate with the rectifier controllers so that signals related to each of the functions of each of the autonomous rectifier controllers may be monitored by and certain parameters controlled from the main controller 108 by way of the backplane 45. The communication links or circuits which provide this interconnection are indicated in FIG. 5B by the numerals 126, 128 and 130. Referring again to FIG. 5A, the interface backplane 45 also includes a suitable interface 132 for interconnecting the control system illustrated with a remote digital central processing unit for monitoring system conditions and for performing control functions, such as might also be also controlled through the keypad 114 and the controller 108.

Figure 6:
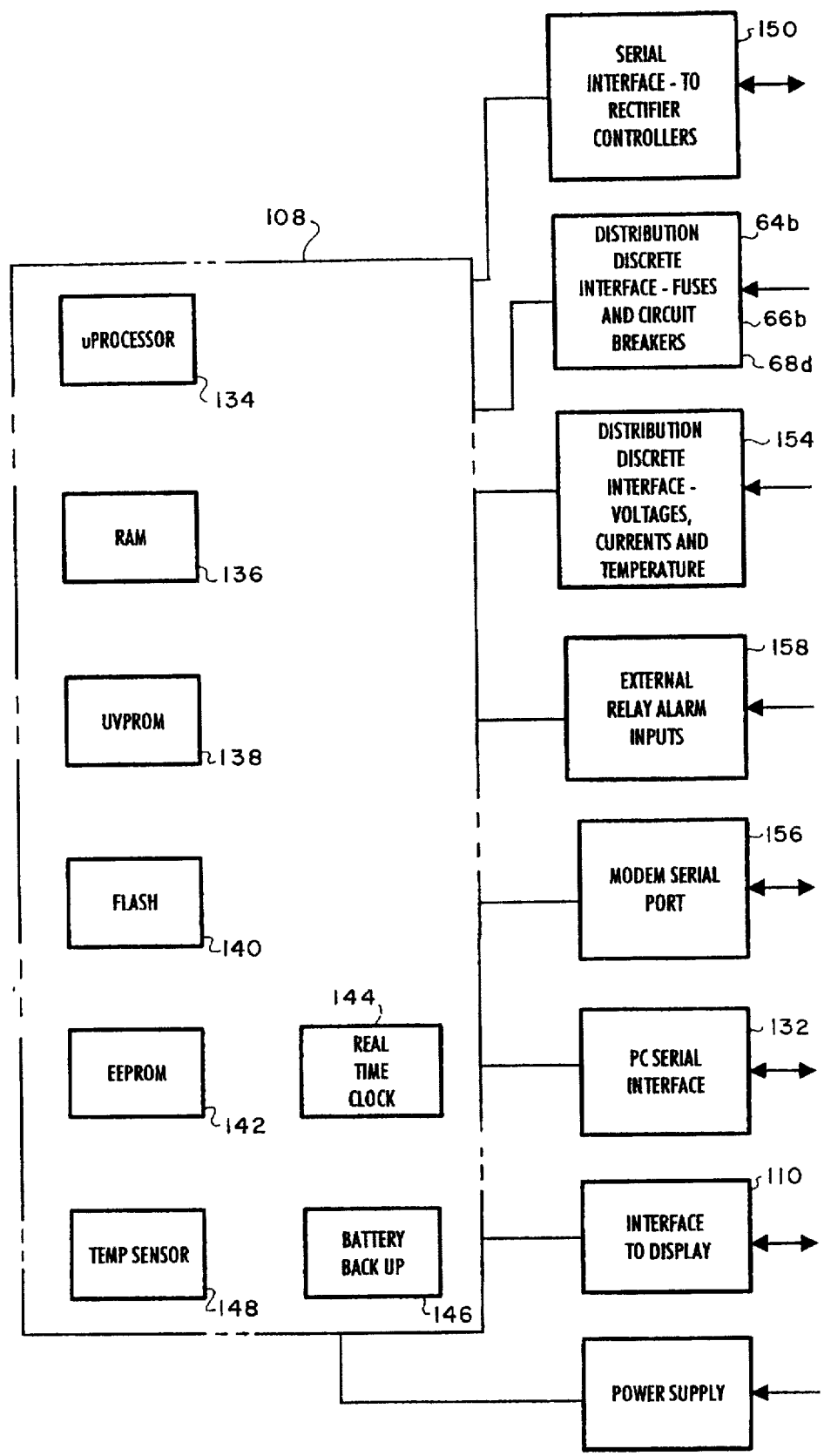
FIG. 6 is a block diagram of a master controller for the control system.

FIG. 6 is a block diagram of the main or master controller 108 indicating that this unit includes a suitable microprocessor circuit 134 together with associated memory circuits 136, 138, 140 and 142, a real time clock 144 and a suitable battery 146 for backup operating purposes. An ambient temperature sensor 148 is also associated with the controller 108 to indicate ambient operating conditions of the system 30. A serial interface 150 is provided for each of the rectifier controllers and the distribution system circuits for each load are monitored through a discrete interface 154 for voltages, currents and temperatures. The controller 108 may be operated remotely, via a telecommunications network, not shown, through a modem, also not shown, by way of a serial port 156. Suitable external relay alarm input signals may be provided to the controller 108 through a circuit 158.

The controller 108 is operable to be programmed to perform certain monitoring tasks and control tasks utilizing, for example, a standard real time operating system known as AMX available from KADAK of Vancouver, British Columbia. The monitoring tasks include monitoring system voltage on the bus 80a, 80b, as well as system currents, including battery current, individual currents output by each of the rectifiers and total current on the bus 80a, 80b. Battery current in and out is monitored as a way of determining possible thermal runaway and to estimate the amount of energy remaining in the battery bank. The controller 108 also monitors and controls the low voltage disconnect devices comprising an arrangement of either device 81, devices 81 and 81a or device 85. Temperatures are monitored at the battery temperature sensor 118 as well as ambient temperature from sensor 148. The controller 108 is also operable to monitor all current protection devices, including the circuit breakers associated with each of the breaker tiers 64, 66 and 68.

Control functions controlled by the controller 108 include battery recharge rate, which is temperature compensated, automatic adjustment of voltage of the rectifiers, and excessive or overvoltage shutdown of any one of the rectifiers or converters if it exceeds its factory preset maximum voltage threshold. As previously mentioned, in the event of an overvoltage shutdown, the controller 108 will attempt an automatic restart of a rectifier or converter three times and, if the overvoltage condition persists, the particular rectifier or converter in question will be permanently removed from operation in the system 30 until a replacement unit is installed. For each of the three low voltage disconnect device configurations available as a system option, the actual low voltage alarm and disconnect voltage thresholds can be set through the controller 108. Moreover, the controller 108 is also operable to control the startup of each of the rectifiers 46, 48, 50 and converters 52 to prevent a startup surge of current from exceeding the level that would be seen if the unit were under normal full load steady state operation. The controller 108 is also operable to time sequence the startup of each rectifier and converter unit, depending on its installed shelf position. The delay between the startup of adjacent units is programmable up to a predetermined sequencing time period.

Alarm conditions for each of the following parameters can be set by the controller 108 and changed, at will. Moreover, a preferential priority may be assigned to each operating parameter. Programmable alarms include, but not limited to, system overvoltage, system undervoltage, individual rectifier failures, a multiple rectifier failure, individual rectifier cooling fan failures, controller overtemperature, circuit breaker trips and fuse blows individually, single converter overvoltage or undervoltage as well as single converter failure or multiple converter failure and converter fan failure. Loss of communication to each module or unit may also be a condition for alarm as well as discharge of the batteries of battery pack 38.

Figure 7:
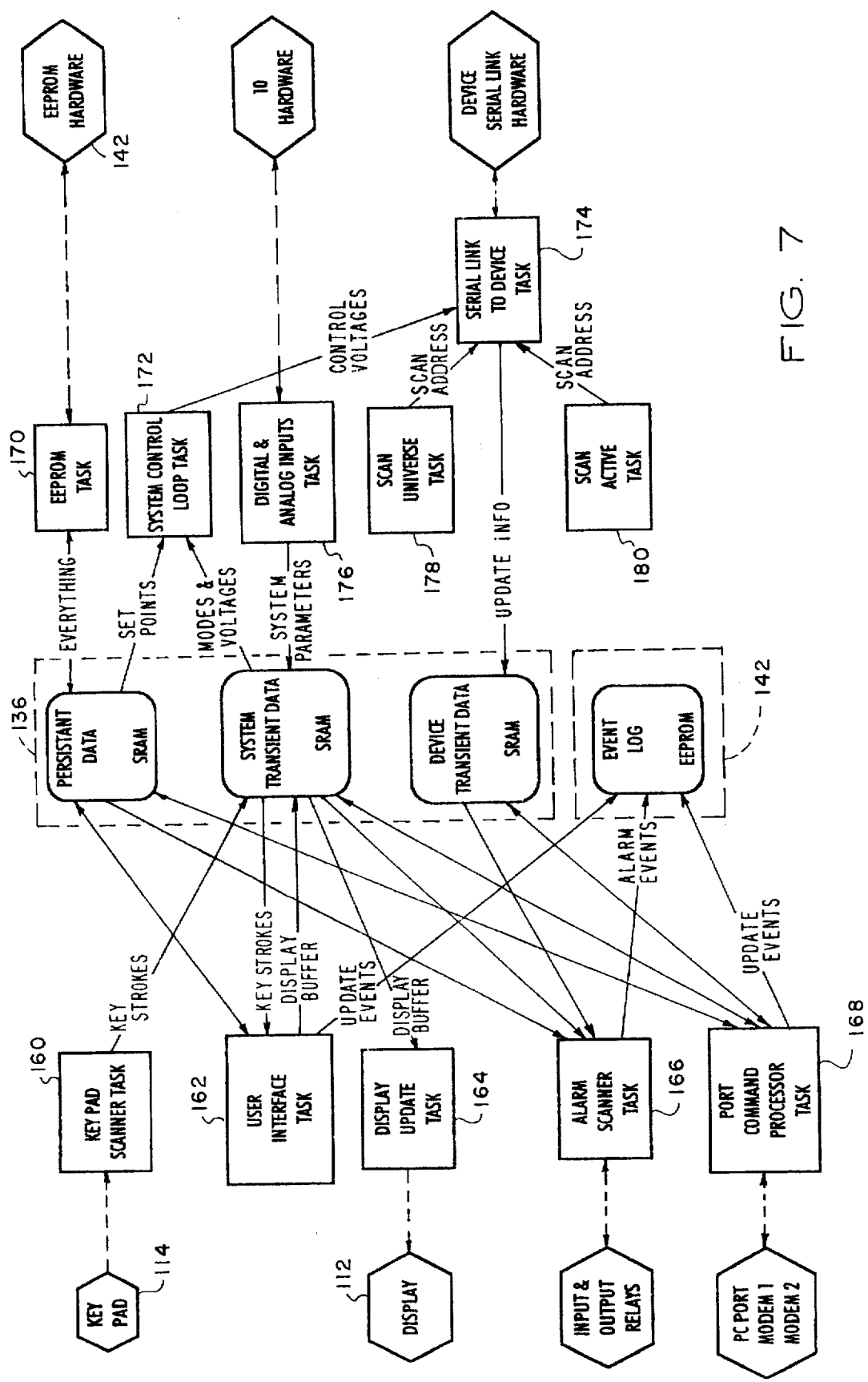
FIG. 7 comprises a data flow diagram for the master controller.

FIG. 7 comprises a data flow diagram for the controller 108. The controller 108 is operable to perform a keypad scanner task indicated at 160 for inputting keypad signals from keypad 114 to SRAM 136. A user interface task is also operable to run on controller 108, indicated by numeral 162, to provide updating of events to memory circuit or EEPROM 142, which is operable to provide an event log or record. A display update task 164 operates to receive system transient data from SRAM 136 for transmission to display 112. Signals from all input and output relays and devices, including the low voltage disconnect devices and circuit breakers described hereinabove, are monitored by an alarm scanner task 166. Alarm events are stored in the event log and the alarm scanner task is updated by system and device transient data from the SRAM 136 and by persistent or unchanging data, such as set point data for each of the operating devices, including the rectifiers, converters, and low voltage disconnect devices. A command processor task 168 is operable to receive commands and communicate data to an independent microprocessor, not shown, via one or more modems, as shown in FIG. 7, whereby persistent data or set points may be changed and system and device transient data may be monitored.

Other tasks which run on the controller 108 include an EEPROM task 170 which provides for storing all persistent data. This task provides for a single gateway for access to the EEPROM hardware. A system control loop task 172 is also carried out by the controller 108 to control the output voltages of the rectifiers and converters through a serial link to device task 174 and the associated hardware. Still further, a digital and analog signal input task 176 is carried out on the controller 108 to update the transient data with new system operating parameters received by way of various components of the system 30 including the individual rectifiers, converters and the battery pack.

A scan universe task 178 is also operable on the system controller 108 and which scans the universe of all addresses in search of a new device or devices to communicate with, such as a newly installed rectifier or converter. When a new converter or rectifier is inserted in the system 30, the scan universe task 178 automatically flags the transient data by applying an address to the data through the serial link to device task. Still further, a scan active task 180 operates on the system controller 108 and scans all active devices (i.e., rectifiers and converters) and updates the transient data of the respective devices.

Figure 8:
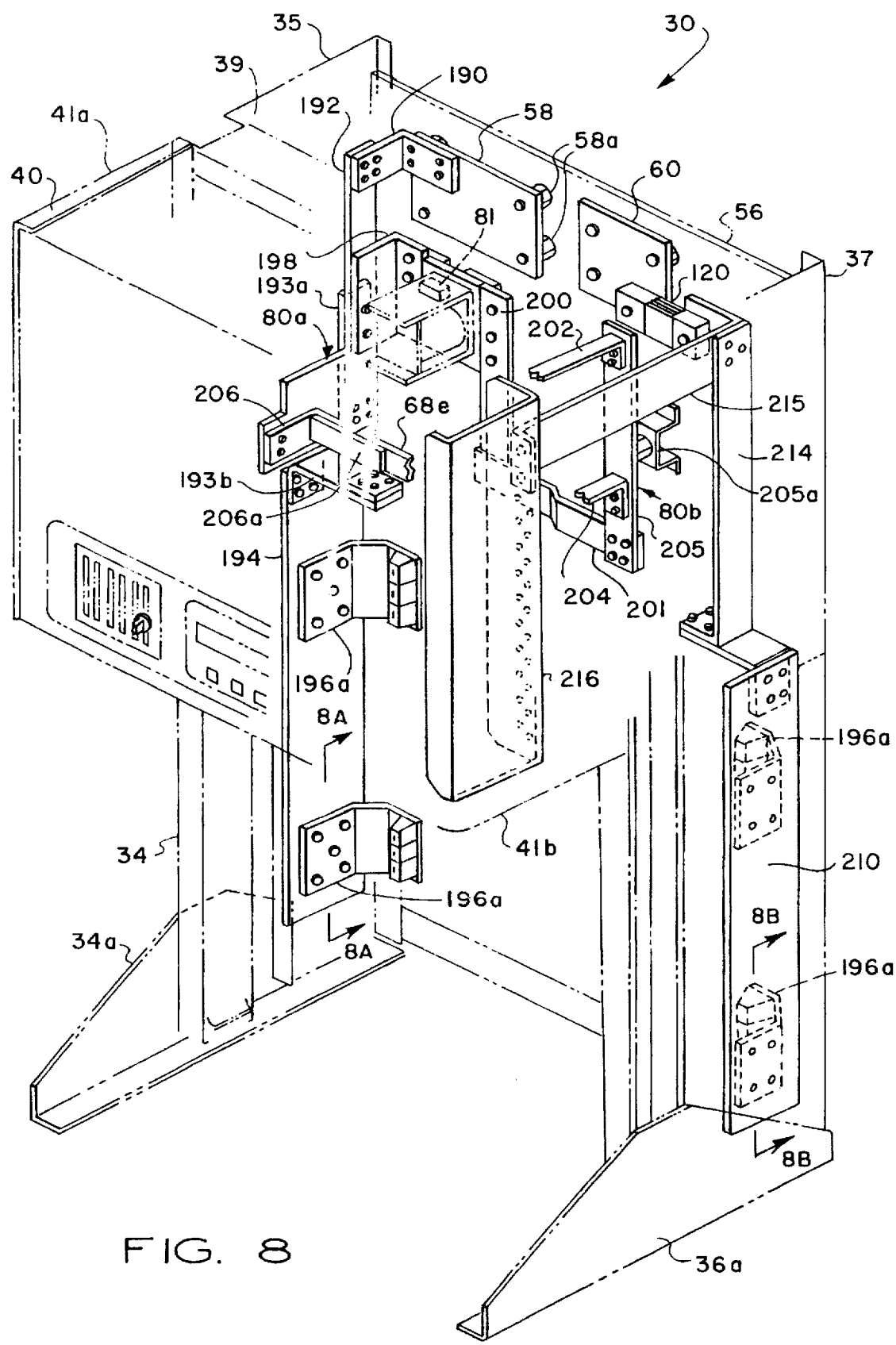
FIG. 8 is a perspective view showing the system frame and DC buswork.

Referring now to FIG. 8, electrical conductor linkage making up the bus 80 and conductor links interconnecting the bus with various arrangements of the low voltage disconnect devices is illustrated and will be described. As shown in FIG. 8, the battery link 58 is mounted on the cabinet plate 56 in a standoff position by suitable insulating members 58a, two shown, link 58 is suitably connected to a bus link 190 by conventional mechanical fasteners which link, in turn, is connected to a link 192 and a depending flat bar type link 194, via links 193a and 193b. Bus link 194 is suitably mounted on cabinet side plate 35 in a standoff position and insulated therefrom. Bus link 194 is suitably connected to spaced apart connector members 196a which operate to provide a conductive path to the rectifiers mounted on the shelves 42 and 44, not shown in FIG. 8. The connectors 196a may be part of a connector assembly of a type commercially available, such as from Elcon Products International Company as one of their "TOP DRAWER" Type connectors. These connectors aid in allowing the rectifiers and converters to be plugged in and unplugged from the system 30 while the system is energized or "hot".

A bus link 198 is connected to link 192 and supports the low voltage disconnect device 81 which is also supported by and forms an interruptable conductor to a continuing bus link 200, 201 and 205 suitably connected to bus links 202 and 204 which lead to the circuit breaker tiers 64 and 66 and are in conductive engagement with respective bus bars for the circuit breaker tiers, not shown in FIG. 8, but described in detail further herein. Bus link 205 is supported by backplate 56 through an insulated standoff 205a. In the arrangement of the low voltage disconnect device 81 shown in FIG. 8, the load disconnect mode, a bus link 206 is operable to be connected to a bus bar 68e for circuit breaker tier 68, not shown in FIG. 8.

Referring briefly to FIG. 8A, a typical arrangement for supporting the bus links is illustrated for bus link 194. In particular, connector 196a is shown in FIG. 8A, suitably fastened to bus link 194 by mechanical fastener means 195. A suitable insulating sheath 197 is shown disposed over the face of link 194 and a suitable insulating sheath 199 is interposed between the bus link 194 and the frame side plate or wall 35. Additional standoff insulator members, such as the members 58a may be interposed between any of the bus links shown and described herein and the system cabinet or frame support structure at suitable spaced apart points to support the bus links in a standoff insulated position from the frame 32 of the power supply system 30.

Referring again to FIG. 8, the ground conductor side of the DC buswork includes a ground plate 210 supported on frame side plate 37 in a manner similar to the manner in which the link 194 is supported on the side plate 35. Spaced apart connector members 196a are mounted on the ground plate link 210 and aligned with the connectors 196a mounted on bus link 194, respectively. FIG. 8B illustrates the mounting arrangement for the ground plate link 210 which is supported in a standoff position from the side plate 37 and insulated therefrom by insulator sheaths 211 and 213 in the same general manner as the sheaths 197 and 199 are arranged, respectively.

Returning to FIG. 8, ground plate link 210 is connected to a ground plate link 214 and to a ground plate link 216 by an intermediate link 215. All ground cables from the respective DC power consuming devices or loads are operable to be connected to ground plate link 216. Link 216 is mounted on cabinet wall 41b in a standoff position using insulator members, not shown, similar to the insulator members 58a. FIG. 8 also illustrates the location of the current shunt 120 which interconnects the ground plate links 214, 215 and the ground plate 60. Those skilled in the art will appreciate that a unique layout of buswork for the load side as well as the ground side of the power supply system 30 is provided by the arrangement illustrated in FIGS. 8, 8A and 8B. Moreover, the various arrangements of the low voltage disconnect devices described above are also conveniently implemented utilizing the buswork described.

Referring now to FIG. 8C, there is illustrated an arrangement of the bus linkages for the configuration of the power supply system 30 where low voltage disconnect devices 81 and 81a are interposed in the circuitry to provide for operation of the power supply system in the load shedding mode. As shown in FIG. 8C, low voltage disconnect device 81a is interposed between bus link 192 and circuit breaker tier bus bar 68e for the circuit breaker tier 68. As with the arrangement of FIG. 8, low voltage disconnect device 81 is interposed between bus linkage members 198 and 200. Accordingly, by removing bus link 206 and interposing low voltage disconnect device 81a between bus link 192 and bus bar 68e, the system low voltage disconnect arrangement may be quickly and easily modified. The bus link 206 as well as the low voltage disconnect device 81a are easily interconnected with the bus linkage and removed therefrom by conventional mechanical fasteners.

Figure 8D:
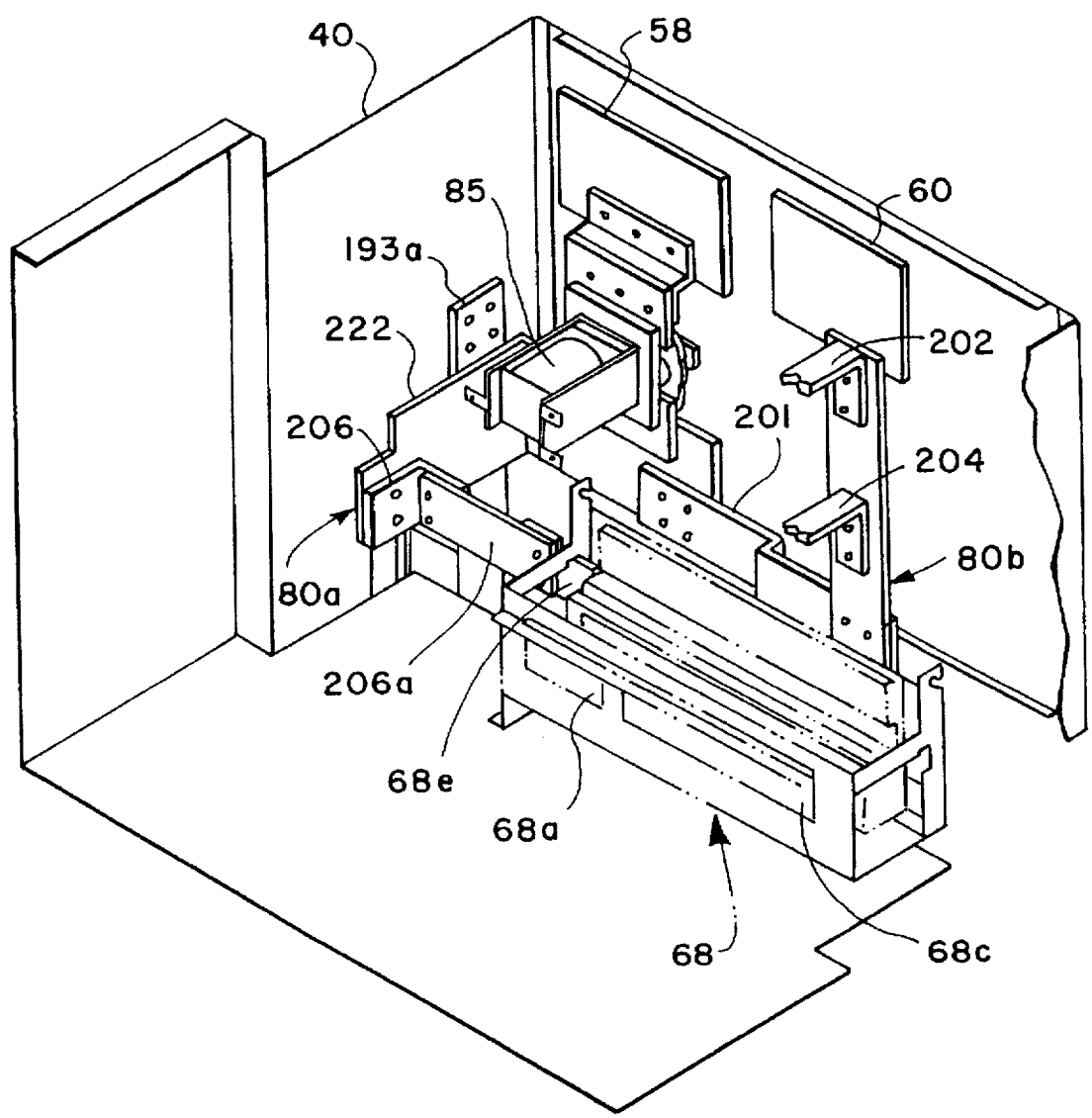
FIG. 8D is a detail perspective view showing an arrangement of another location of a low voltage disconnect device in the buswork.

Referring now to FIG. 8D, there is illustrated the arrangement of the bus linkage for the configuration of system 30 wherein low voltage disconnect device 85 is interposed between battery bus link member 58 and the DC bus linkage connected to the power supply system. A bus link 222 is connected to the buswork in place of bus links 190 and 192 and bus link 222 is also suitably connected to the low voltage disconnect device 85. Bus link 222 is also connected to bus link 193a and 206 so that breaker tier 68 is provided with DC power via link 206a. Bus link 222 is also connected to link 201 so that power is supplied to the links 202 and 204 leading to the bus bars of the respective breaker tiers 66 and 68 as described above. Low voltage disconnect device 85 interconnects bus link 58 with the above-described linkage. Accordingly, by merely substituting disconnect device 85 and link 222 for links 190 and 192 and low voltage disconnect device 81, a battery side low voltage disconnect operating mode only may be obtained with the bus configuration shown in FIG. 8D.

Moreover, by arranging the buswork for the rectifier units and converter units, generally as described herein, particularly by arranging the bus links 194 and 210 along the frame members 35 and 37, one or more of the shelves 42 or 44 may be removed and other equipment installed and supported by the frame 32 of the system 30 without requiring modification of the buswork and without interfering with the buswork. Such equipment may be desirable in certain installations for location on the system 30, even though the particular equipment installed may not be directly connected to the system 30. In any case, the general arrangement of the frame of the system 30 and the bus linkage provides this versatile feature of supporting related or unrelated equipment on the frame without interfering with the conductor elements of the system 30.

Figure 10:
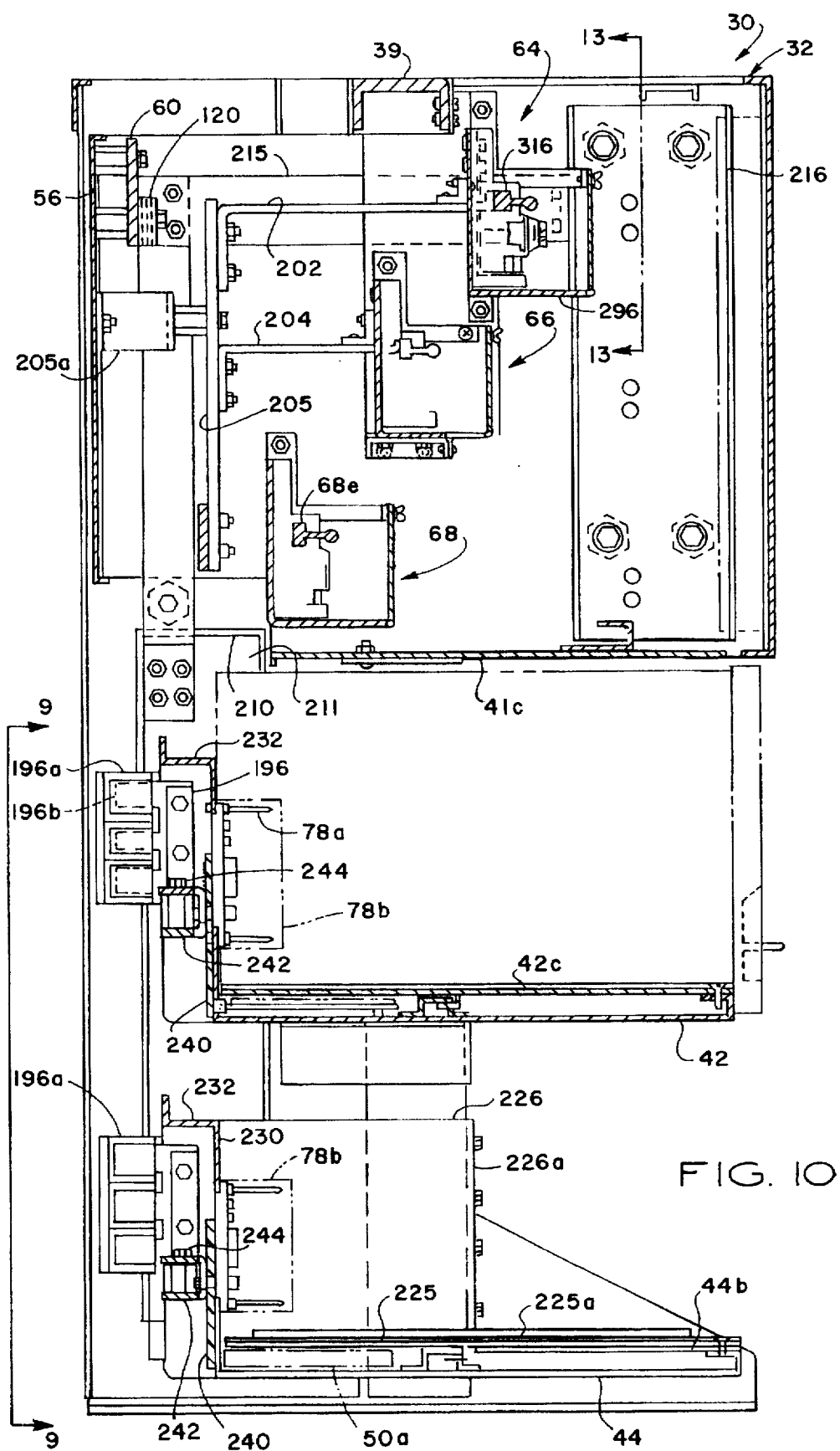
FIG. 10 is a vertical section view taken generally from the line 10—10 of FIG. 1.

Referring now to FIGS. 1, 9 and 10, shelf 44 is shown by way of example with its attendant apparatus. The shelf 42 is similar in some respects and will be described further herein with regard to the installation of an adapter for the converters 52. As shown in FIGS. 9 and 10, the shelf 44 includes a generally horizontally extending bottom plate 224 and spaced apart, upstanding, integral side plates 226 and 228. Opposed transversely extending flanges 226a and 228a are integral with the side plates 226 and 228 and are adapted to be secured to respective ones of the upstanding column members 34 and 36 by conventional mechanical fasteners, not shown. The shelf 44 also includes an upstanding transverse back plate 230 which is folded into the horizontal plane to provide a transversely extending tray 232. The back plate 230 is adapted to support the respective connectors 78 including the connector member 78a which has suitable sockets or pins, as the case may be, for cooperating with the connector members 78b for each rectifier 46, 48, 50 and a fourth rectifier 51 shown in FIG. 9. As shown in FIG. 10, in particular, the transverse bottom plate 224 supports an intermediate slide plate 225 between the side plates 226 and 228, and having antifriction cover sheets 225a for each slot or receptacle of shelf 44 disposed thereon. Plate 225 forms a closure over the respective converter controllers 46a, 48a, 50a and 51a. The controllers 46a, 48a, 50a and 51a, FIG. 9, are each operably connected to circuit means disposed on a printed circuit board backplane member 240 supported on and extending between the connector members 78a, respectively, by way of suitable connectors 240a. Backplane member 240 supports the communication link circuit 126, for example.

As further shown in FIGS. 9 and 10, each shelf 42 and 44 includes opposed bus links 242 and 244 which, on shelf 44, are operable to be electrically connected to each of the rectifiers 46, 48, 50 and 51 through the connectors 78. In particular, the bus link 242 comprises a suitable metal bar having an upstanding leg 242a, see FIG. 11 also, and a generally horizontally extending leg 242b. In like manner, the ground bus link 244 includes an upstanding leg 244a and a generally horizontally extending leg 244b. The legs 242b and 244b include upstanding and depending tab portions 242c and 244c which are connected to suitable conductor means 242d and 244d in communication with the rectifiers, by way of the connectors 78.

Figure 11:
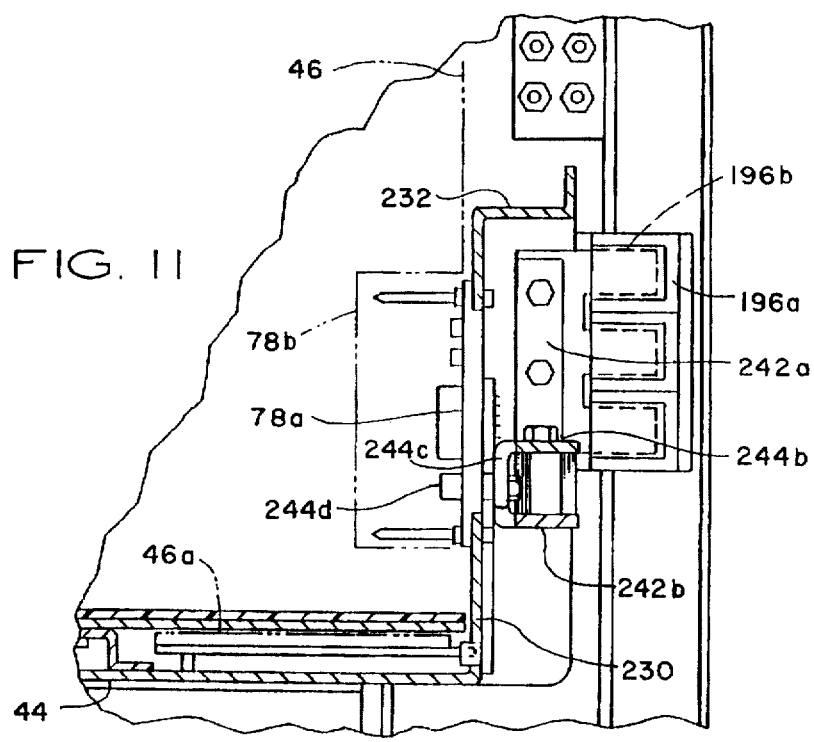
FIG. 11 is a detail section view taken from line 11—11 of FIG. 9.

Referring further to FIGS. 9 and 11, each bus link 242 is secured to a connector element 196b comprising plural blades or tines which are operable to project into the connector member 196a. In like manner, each ground plate link 244 is also secured to a connector member 196b which is operable to releasably engage the other connector member 196a. As shown in FIG. 9, the bus links 242 and the ground conductor links 244 are each supported on by suitable fasteners and standoff insulator members 245 which are secured to the upstanding side plates 228 and 226, respectively. Accordingly, as a shelf 42 or 44 is installed, the connector members 196b are automatically inserted into engagement with the connector members 196a, respectively, to connect the rectifier or converter units plugged into the connectors 78 with the circuitry of the power supply system 30. The bus links 242 and 244 are also held in spaced relationship by spaced apart insulator spacer members 247, FIG. 9, which are suitably secured to each of the link portions 242b and 244b by suitable threaded fasteners 249a and 249b.

As mentioned previously, the circuit board backplane 240 is advantageously mounted on the shelf 44 and includes circuit elements which are directly connected to the connectors 78 and to the controllers 46a, 48a, 50a and 51a, for example. The circuitry disposed on the backplane or board 240 also includes the communications circuitry to the master controller such as the circuits 126 and 128, for example. A suitable connector 250 is mounted on the backplane 240 and is operable to serve as a conductor disconnect point for the conductors leading to the master controller backplane 45. Referring further to FIG. 9, connector members 251a are supported on tray 232 and are connected to conductors leading to each connector 78. Connector members 251b are connected to the AC distribution bus 75 via suitable conductors. Thus, shelves 42 and 44 may further be easily inserted or removed from the system 30 by disconnecting the AC conductors leading to connectors 78 at connectors 251a, 251b.

Figure 12:
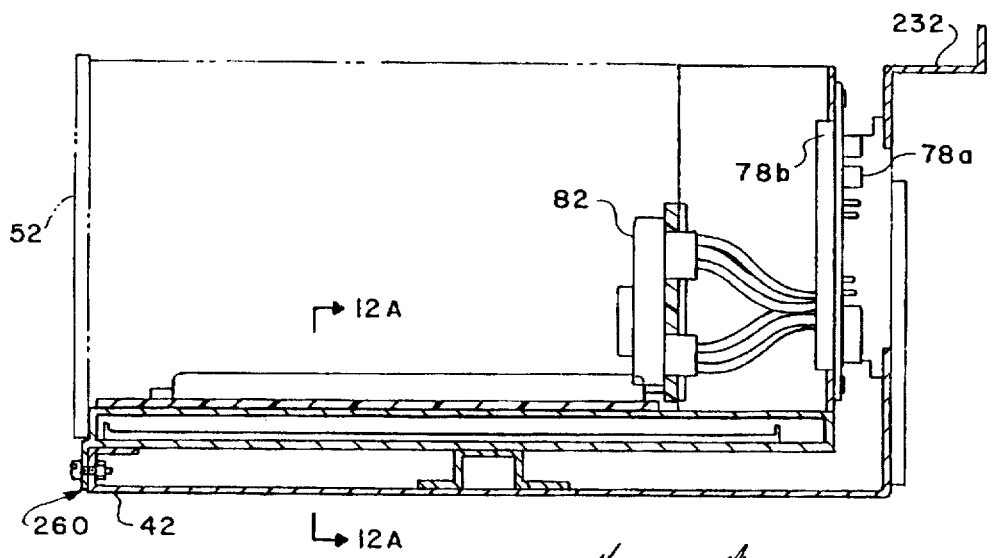
FIG. 12 is a detail section view taken generally from the line 12—12 of FIG. 1.
Figure 12A:
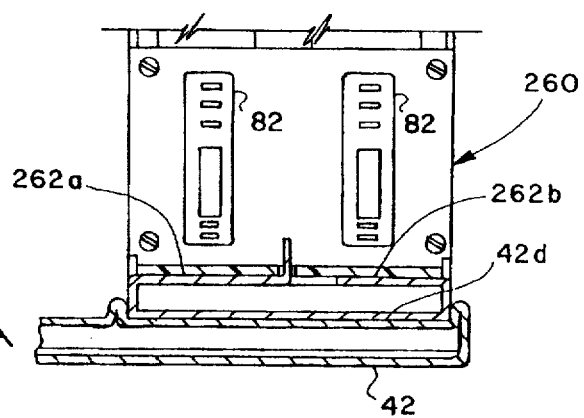
FIG. 12A is a detail view taken from the line 12A—12A of FIG. 12.

Referring to FIGS. 12 and 12A, each of the converters 52 is operable to be removably mounted on a shelf adapter member 260 wherein each converter may be slidably inserted in a slot 262a or 262b on the adapter member and connected to a connector 82 similar in some respects to the connectors 78. Spaced apart connectors 82 are supported on a transverse plate portion 266 of the adapter 260 and a connector element 78b is also supported on a second transverse plate portion 268 forming part of the adapter member 260. Accordingly, when it is desired to insert a converter 52 in one of the slots or receptacles in shelf 44, the adapter 260 is first inserted in the slot or receptacle normally occupied by a rectifier unit and suitable circuitry is provided on the adapter for communicating through the circuitry on the backplane 45 to the controller 108 so that the converters 52 may be controlled and monitored also in the same manner that the rectifiers 46, 48, 50, 51 are controlled and monitored.

When converters, such as the converters 52, are installed on a shelf, such as the shelf 42, with the associated adapters 260, the electrical connections between the converters and the circuitry of the system 30 are somewhat modified. In particular, the converters are connected to the ground bus link 242 of shelf 42 through the respective connectors 78a, 78b, but a plus 24 volt conductor is connected through the connectors 78a, 78b and connector 82 to the converter by way of the breaker tier 68a so that respective circuit breakers 68b are in circuit, as indicated in FIG. 3. Still further, suitable conductor means are interconnected between the connectors 82, 78 and the bus 84 to provide the minus 48 volt output from the converters 52 to the breaker tier 68c, as shown in FIG. 3. Suitable connectors such as the connectors 251 may be interposed on tray 232 for shelf 42 to provide a quick disconnect point for the conductors between the plus 24 volt buswork and the minus 48 volt output conductor from the converters 52.

Figure 13:
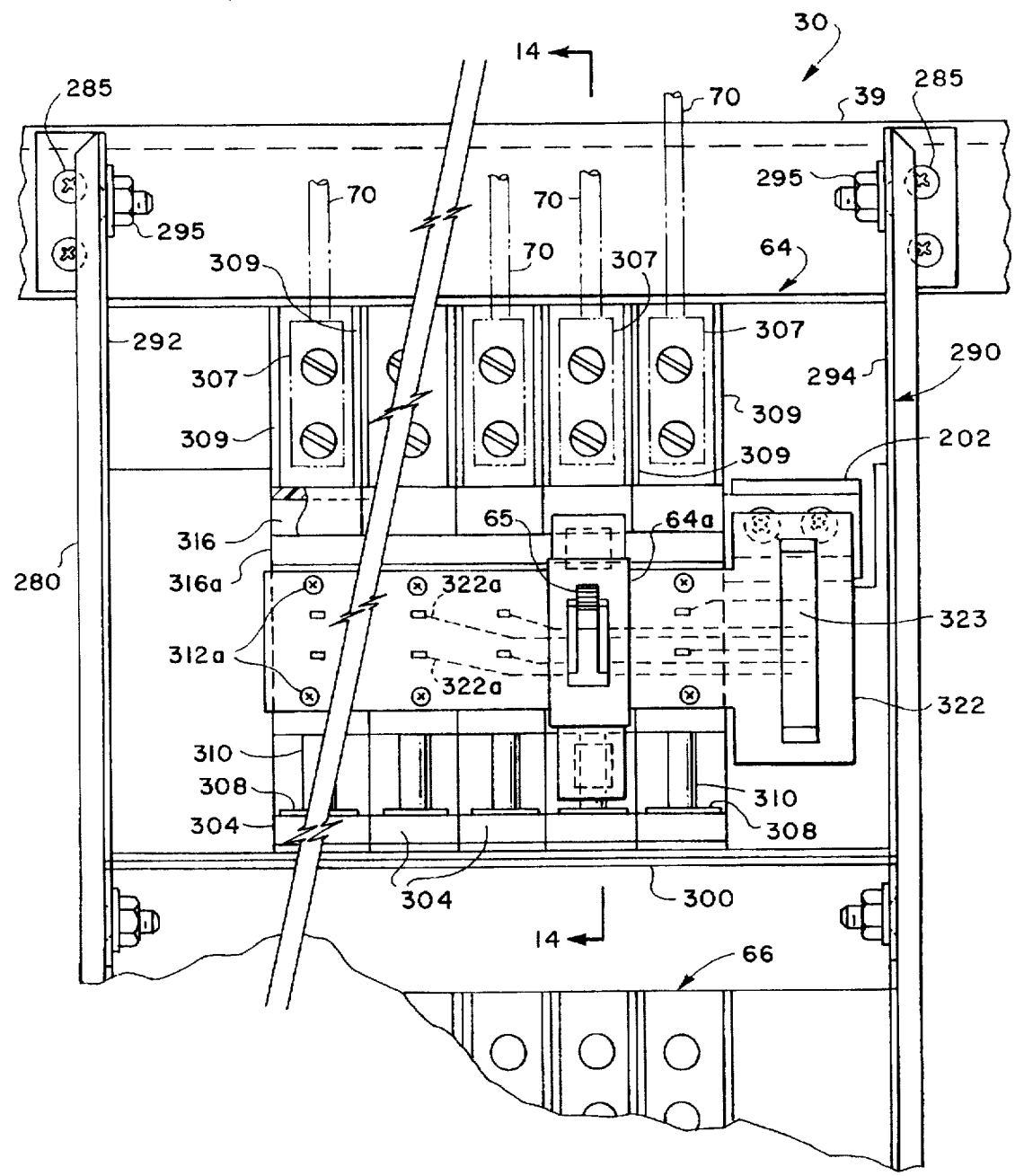
FIG. 13 is a detail view taken generally from the line 13—13 of FIG. 10.
Figure 14:
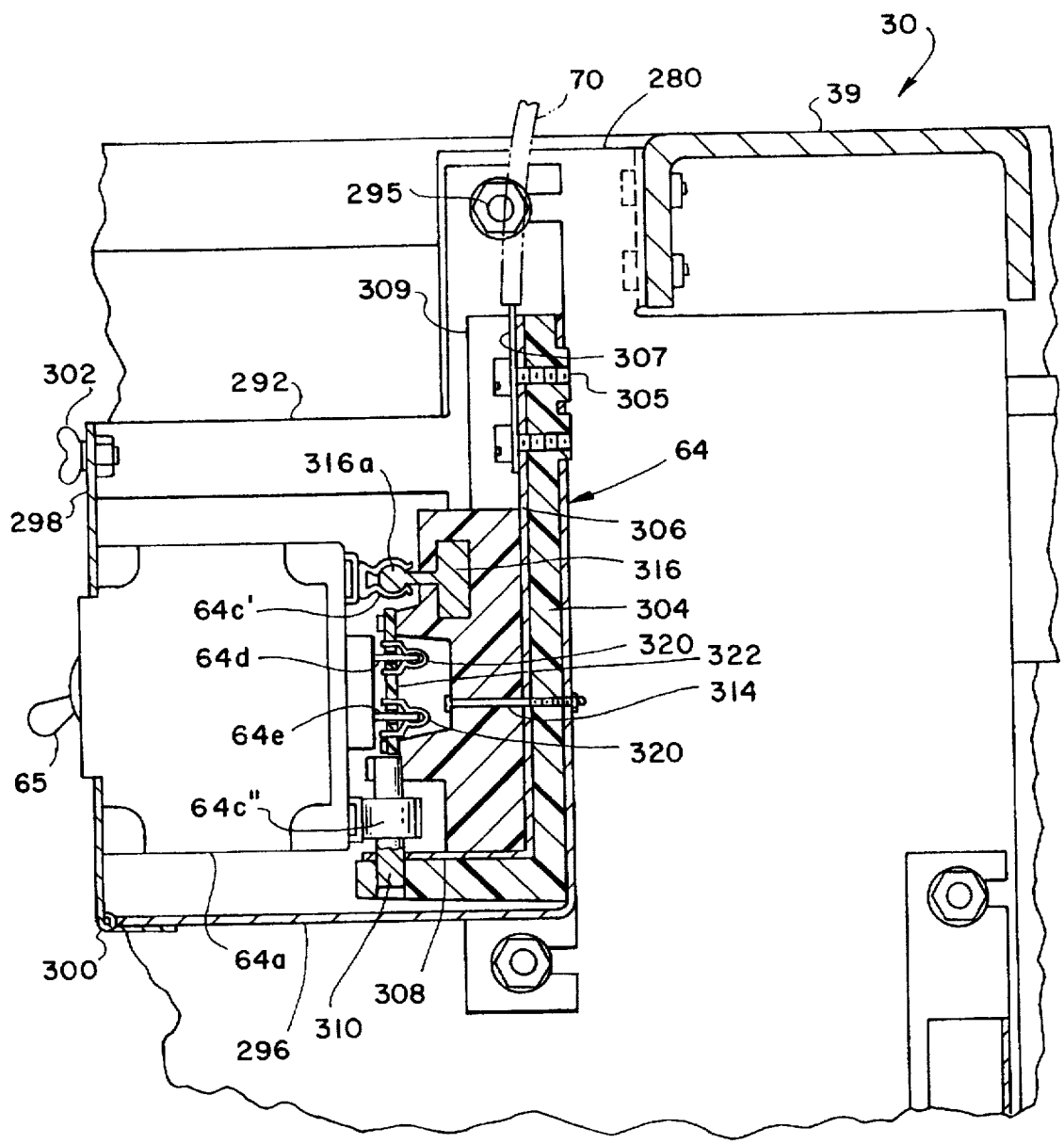
FIG. 14 is a section view taken generally from the line 14—14 of FIG. 13.

Referring now to FIGS. 13 and 14, certain details of the breaker tier 64 are illustrated. The breaker tiers 66 and 68 are similarly configured and supported in the cabinet 40, as previously discussed and shown in some detail in FIG. 2. The circuit breaker tiers 64, 66 and 68 are each at least partially supported by spaced apart depending support plates 280 and 282, FIGS. 13 and 14, which are removably fastened to the frame cross member 39 by suitable fasteners 285. The circuit breaker tier 64, for example, includes an enclosure 290 having spaced apart upstanding sidewalls 292 and 294 which are connected to the support plates 280 and 282 by fastener means 295. The enclosure 290 includes a transverse bottom wall 296 and a front wall 298 which is hinged to the bottom wall 296 at hinge means 300, FIG. 14. Suitable latch means 302 is operable to maintain the front wall in a closed position.

Each of circuit breakers 64a includes an actuator 65 accessible from the front of cabinet 40 and facing front wall 45. Each circuit breaker 64a is operable to be mounted on support structure comprising an electrically non-conducting somewhat L-shaped support member 304, FIG. 14, which supports a somewhat L-shaped generally flat strip-like conductor member 306 having a transverse leg portion 308 which is connected to an upstanding conductor pin 310, as illustrated. Conductor pin 310 is supported by the support member 304 and a support block formed of a non-conducting material and generally designated by the numeral 312. The structure comprising the support members 304 and 312, together with the conductor 306, 308, is held in assembly by a suitable fastener 314 secured to a backwall 297 of the enclosure for the circuit breaker tier 64. The support member 312 includes an elongated slot 313 which supports a continuous bus bar 316 which is operable to be connected to the bus bar 202, see FIG. 2. As further shown in FIGS. 13 and 14, each of plural support members 304 includes removable fasteners 305 adapted to secure the terminal ends 307 of cables 70 for the respective DC loads attached to the power supply system, as described previously. The support members 304 also include spaced apart, parallel partition portions 309 forming channels therebetween for receiving the respective cable terminal ends 307 while preventing accidental contact between the respective terminal ends.

As shown in FIGS. 13 and 14, each of the circuit breakers 64a is operable to be secured to a respective conductor 306 by way of conductor pin 310 and to the bus bar 316. Each of the circuit breakers 64a is of a type commercially available, such as a type Airpax IEL manufactured by North American Phillips Corp. and includes suitable snap on and off contact clips 64c' and 64c" for engagement with an elongated cylindrical bar part 316a of the bus bar 316 and a conductor pin 310, respectively. Each of the circuit breakers 64a also has an internal circuit indicating when the circuit breaker has tripped or opened to disconnect a load from the power supply system 30. Respective contactor blades 64d and 64e project from each circuit breaker 64a and are engageable with contactor clips 320 which are mounted on a circuit board backplane 322 of interface 64b, supported on the support members 312 by removable fasteners 312a and extending the length of the circuit breaker tier 64 as shown in FIG. 13. The circuit backplane 322 is provided with suitable printed circuit conductors 322a, leading to each of the clips 320 for each circuit breaker 64a, whereby suitable signals may be transferred to the master controller 108 to indicate when a circuit breaker has tripped.

Figure 15:
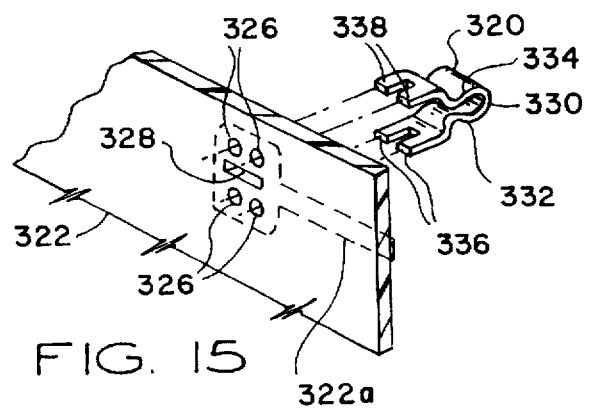
FIG. 15 is a detail perspective view of one of the unique connector clips for the circuit breaker tiers.

FIG. 15 shows, by way of example, how each of the unique contact clips 320 is configured and mounted on the backplane member 322. Referring to FIG. 15, there is illustrated the manner in which each of the contact clips 320 is supported on the backplane 322. The backplane 322 includes plural spaced apart holes 326 formed therein on each side of a transverse slot 328 for receiving a contact blade 64d or 64e, for example. The contact clips 320 each include a somewhat arcuate base portion 330 having opposed legs 332 and 334 formed integral therewith. The legs 332 and 334 have distal ends delimited by spaced apart prongs 336 and 338, respectively, as shown in FIG. 15. The prongs 336 and 338 are operable to project through the holes 326 and be soldered to the backplane at 322 and in electrically conductive engagement with conductor means 322a, also formed on the backplane in a conventional manner. Accordingly, circuit paths may be formed leading to each of the clips 320 individually on the backplane 322 so that when a circuit breaker 64a has undergone a change in state, a signal may be transmitted to the master controller 108 to indicate exactly which circuit breaker has undergone such a change. As previously mentioned the backplane 322 is operable to be connected to the master controller 108 via a suitable connector 323, FIG. 13, whereby circuits to each of the plural circuit breakers 64a, one shown in FIGS. 13 and 14, of the circuit breaker tiers 64 may be monitored by the control system. The circuit breaker tiers 66 and 68 are similarly constructed and those skilled in the art will understand this aspect of the present invention without a detailed description of each tier.

The construction of the power supply system 30 is believed to be within the purview of one skilled in the art. The components described hereinabove and not identified by a commercial source may be constructed using conventional engineering materials for electrical power supply systems. Certain ones of circuit elements which are believed to be readily understandable to those of skill in the art have not been described in detail in the interest of clarity and conciseness. Moreover, although a preferred embodiment of a power supply system in accordance with the invention has been described herein, those skilled in the art will also recognize that various substitutions and modifications may be made without departing from the scope and spirit of the invention as recited in the appended claims.

What is claimed is:

1. A power supply system, particularly adapted for converting AC electrical power into DC electrical power for supply to one or more power consuming devices, said system comprising:

a frame;

circuit means supported on said frame including means for connecting said power supply system to a source of AC electrical power;

at least one shelf means supported on said frame including plural slots thereon and operable to removably support plural AC to DC rectifier units whereby each of said rectifier units may be selectively positioned on said shelf means and removed from said shelf means, at will, to accommodate changes in electrical power requirements of DC electrical loads connected to said power supply system;

connector means on said shelf means for connecting said rectifier units, respectively, to a bus, a ground plate and to said source of AC electrical power, said bus and said ground plate being supported on said frame; and plural circuit breakers mounted on said frame and operable to be connected to said bus and including respective connector means for connecting said rectifier units to plural DC electrical loads, through respective ones of said circuit breakers.

2. The power supply system set forth in claim 1 including:
at least one DC voltage converter unit adapted to be disposed in a predetermined slot on said at least one shelf means and operably connected to a conductor bus and to circuit breaker means for delivering DC power to a selected number of loads at a voltage different from the voltage imposed on said bus by said rectifier units.

3. The system set forth in claim 2 including:
an adapter member operable to be inserted in a predetermined slot on said shelf means for receiving and supporting said at least one converter unit and for interconnecting said at least one converter unit with said conductor bus and with said circuit breaker means for distributing power at said voltage different from the voltage of said rectifier units.

4. The power supply system set forth in claim 2 including:
a low voltage disconnect device interposed in said bus between said rectifier units and said plural loads and operable to disconnect said power supply system from said plural loads at a predetermined minimum voltage on said bus.

5. The power supply system set forth in claims 2 or 4 including:
a low voltage disconnect device interposed between said rectifier units and said at least one converter unit and operable to disconnect said at least one converter unit from said rectifier units at a predetermined minimum voltage on said bus.

6. The power supply system set forth in claims 5 including:
battery means operably connected to said bus for supplying DC electrical power to said plural loads; and
a low voltage disconnect device interposed in a circuit between said battery means and said bus and operable to disconnect said bus from said battery means at a predetermined minimum voltage.

7. The power supply system set forth in claim 1 including:
rectifier controller means associated with each of said rectifier units for controlling the DC output voltage of each of said rectifier units, respectively, to maintain a predetermined voltage on said bus.

8. The power supply system set forth in claim 7 wherein:
said rectifier controller means includes means for sensing a current output of said rectifier unit.

9. The power supply system set forth in claim 1 including:
a cabinet mounted on said frame including a movable front wall, said shelf means being disposed on said frame for placing said rectifier units on or removing said rectifier units from said shelf means from a side of said cabinet which includes said movable front wall.

10. The power supply system set forth in claim 9 wherein:
said connector means for said circuit breakers are disposed on said frame such that said connector means are accessible from a side of said cabinet which includes said movable front wall for connecting cables to and disconnecting cables from said circuit breakers, respectively.

11. The power supply system set forth in claim 9 wherein:
said circuit breakers each include actuator means facing said front wall.

12. The power supply system set forth in claim 9 including:
a ground plate bus link mounted in said cabinet including means for connecting ground conductor cables from respective ones of said plural loads to said ground plate bus link from the front of said cabinet.

13. The power supply system set forth in claim 1 including:
support means for said circuit breakers, said support means including a bus link operable to be connected to respective ones of said circuit breakers and spaced apart conductor means operable to be releasably connected to said circuit breakers, respectively.

14. The power supply system set forth in claim 13 wherein:
said connector means for said circuit breakers comprise conductor members each terminating at a position above said circuit breakers, respectively, and including fastener means for connecting respective conductor means associated with said circuit breakers to respective ones of said plural loads by way of respective cable means.

15. The power supply system set forth in claim 13 including:
a backplane mounted on said support means for said circuit breakers including conductor means engageable with conductor means mounted on said circuit breakers, respectively, for transmitting a signal indicating an operating condition of said circuit breakers, respectively.

16. The power supply system set forth in claim 15 including:
spaced apart elastically deflectable clips mounted on said backplane and operable to be forcibly engaged with conductor blade means mounted on said circuit breakers for forming a connection between said circuit breakers and said circuit means on said backplane.

17. The power supply system set forth in claim 1 wherein:
said shelf means includes means cooperable with said frame for releasably connecting said shelf means to said frame in a selected working position, said shelf means includes a bus link supported thereon and connected to respective ones of said connector means for said rectifier units; and
a ground plate link supported on said shelf means and connected to respective ones of said connector means for each of said rectifier units for interconnection with a ground conductor on said rectifier units, respectively.

18. The power supply system set forth in claim 17 including:
connector means mounted on said shelf means and connected to said bus link and said ground plate link on said shelf means, respectively, and operable to be releasably connected to cooperating connector means supported on said frame, said cooperating connector means supported on said frame being in electrically conductive engagement with said bus and said ground plate, respectively.

19. The power supply system set forth in claim 1 including:
a circuit backplane mounted on said shelf means and including circuit means thereon for conducting signals between each of said rectifier units and respective rectifier controllers mounted on said shelf means through said connector means for said rectifier units, respectively.

20. The power supply system set forth in claim 1 including:
cabinet means supported on said frame and including a movable front wall, said cabinet means including a backplane mounted on said front wall including circuit means thereon forming an interface between a controller unit including a microprocessor and signal communicating circuits mounted on said shelf means and connected to said rectifier units, respectively, for monitoring and recording signals indicating the operating conditions of said rectifier units, respectively.

21. A power supply system, particularly adapted for converting AC electrical power into DC electrical power for one or more power consuming devices, said system comprising:

a frame;

a current conducting bus supported on said frame and a current conducting ground plate supported on said frame;

removable shelf means supported on said frame including plural slots thereon operable to support plural AC to DC rectifier units whereby each of said rectifier units may be selectively positioned on said shelf means and removed from said shelf means at will;

first connector means mounted on said shelf means at each of said slots for connecting said rectifier units, respectively, to said bus and said ground plate and to a source of AC electrical power; and second connector means supported on said shelf means and said frame and operable to provide a current conducting path between said bus and said rectifier units and between said ground plate and said rectifier units, respectively.

22. The power supply system set forth in claim 21 wherein:

said shelf means includes a bus link supported thereon and connected to respective ones of said first connector means for said rectifier units and to said second connector means for interconnecting said rectifier units with said bus; and a bus link supported on said shelf means and connected to respective ones of said first connector means and said second connector means for interconnecting said rectifier units with said ground plate.

23. The power supply system set forth in claim 21 including:

rectifier controller means associated with each of said rectifier units and supported on said shelf means for controlling the DC output voltage of each of said rectifier units, respectively.

24. The power supply system set forth in claim 23 wherein:

said rectifier controller means includes means for sensing a current output of said rectifier units, respectively.

25. A power supply system particularly adapted for converting AC electrical power into DC electrical power for supply to plural power consuming devices and for supplying DC electrical power from a battery bank to said plural power consuming devices, said system comprising:

a frame;

a plurality of AC to DC rectifier units supported on said frame;

a current conducting bus supported on said frame and operable to conduct current from said rectifier units and from said battery bank to plural power consuming devices; and said bus including means for selectively interposing low voltage disconnect devices in said bus in such a way as to provide for one of disconnecting said bus from said battery bank, disconnecting said bus from said power consuming deices and disconnecting said bus from a first set of power consuming devices and a second set of power consuming devices in a predetermined sequence.

26. In a power supply system, particularly adapted for converting AC electrical power into DC electrical power to supply a plurality of power consuming devices, a plurality of AC to DC rectifier units, shelf means including plural receiving slots for said plural rectifier units, connectors at each of said slots for plug in connection and disconnection of respective ones of said rectifier units to a source of AC electrical power and to a common DC bus, and connectors at each of said slots for connecting said rectifier units to respective rectifier controller means, a control system for said power supply system comprising:

rectifier controller means disposed on said shelf means and operably connected to said connectors at each slot for controlling the DC output voltage of each of said rectifier units, respectively, to maintain a predetermined voltage on said bus; and a master controller including a microcontroller unit operably connected to each of said rectifier controller means and operable to control the DC output voltage of each of said rectifier units through said rectifier controller means, respectively.

27. The power supply system set forth in claim 26 wherein:

said rectifier controller means each include means for sensing a DC current output of said rectifier units, respectively.

28. The power supply system set forth in claim 26 including:

a current sensor interconnected between said master controller and said bus for indicating total current flow between said bus and a battery bank connected to said power supply system.

29. The power supply system set forth in claim 28 including:

a temperature sensor interposed in said battery bank and operably connected to said master controller for indicating the temperature of said battery bank, and a temperature sensor operably connected to said master controller and operable to measure the ambient temperature of said power supply system.

30. The power supply system set forth in claim 26 including:

plural circuit breakers interposed between said bus and plural power consuming devices connected to said power supply system, each of said circuit breakers including indicator means for indicating whether said circuit breaker is in an open or closed position; and circuit means connected to said indicator means of said circuit breakers, respectively, and to said master controller for indicating which circuit breakers are in an open or closed position, respectively.

31. The power supply system set forth in claim 26 including:

at least one low voltage disconnect device interposed between one of said bus and a battery bank and said bus and selected ones of said power consuming devices; and circuit means interconnecting said at least one low voltage disconnect device with said master controller for control of a minimum voltage on said bus at which power is supplied to said bus by said battery bank and to said selected ones of said power consuming devices, respectively.

32. The power supply system set forth in claim 26 including:

circuit means interconnecting said bus and a ground plate and operable to measure the DC voltage on said bus and to communicate said DC voltage on said bus to said master controller.

33. The power supply system set forth in claim 26 wherein:

said control system includes means for monitoring the DC voltage on said bus, the DC voltage output from each of said rectifier units, the DC current output from each of said rectifier units, the operational status of a cooling fan for each of said rectifier units, and means for adjusting the output voltage for each of said rectifier units, respectively.

34. A power supply system, particularly adapted for converting AC electrical power into DC electrical power for one or more power consuming devices, said system comprising:

a frame comprising spaced apart, generally upstanding frame members defining one of a shelf receiving and equipment receiving space between said frame members;

a current conducting bus supported on said frame on one of said frame members and a current conducting ground plate supported on the other of said frame members;

connector means supported by said frame members, respectively, and connected to respective ones of said bus and said ground plate; and means on said frame members, respectively, for supporting at least one removable shelf means for supporting at least one AC to DC rectifier unit, said shelf means further including connector means mounted thereon and cooperable with said connector means supported by said frame members to connect said at least one rectifier unit to said bus and said ground plate, respectively.

35. The power supply system set forth in claim 34 including:

cabinet means supported on said frame between said frame members and including a movable front wall, said cabinet means including control circuit means disposed therein for forming an interface between a controller unit and said at least one rectifier unit.

36. The power supply system set forth in claim 34 wherein:

said bus and said ground plate are supported on said frame members in standoff positions and insulated from said frame members, respectively.

37. The power supply system set forth in claim 34 including:

plural spaced apart connector means mounted on said bus and plural spaced apart connector means mounted on said ground plate for connecting said bus and said ground plate to bus linkage supported on plural spaced apart shelves operable to be supported on said frame, respectively.

38. In a power supply system for supplying DC electrical power to a plurality of power consuming devices, said power supply system including at least one of plural AC to DC rectifier units and DC voltage converter units operable to be connected to a bus in n+1 redundancy for supplying DC electrical power through said bus to said power consuming devices, and a master controller including a digital processing unit, a memory circuit, and an interface between said controller and each of said rectifier units and said converter units, the method of operating said power supply system comprising the steps of:

causing said master controller to at least one of monitor and control selected operating parameters of each of said rectifier units and said converter units while maintaining said n+1 redundancy of said rectifier units and said converter units in said system.

39. The method set forth in claim 38 wherein:

said step of at least one of monitoring and controlling each of said rectifier units and said converter units comprises monitoring the DC output voltage of each of said rectifier units and said converter units, measuring the operating temperature of each of said rectifier units and said converter units, and monitoring the DC output current of each of said rectifier units and said converter units.

40. The method set forth in claim 39 including the step of:

causing selected ones of said rectifier units and said converter units to supply DC electrical power while monitoring said DC output voltage of each of said rectifier units and said converter units and causing selected ones of said rectifier units and said converter units to cease supply of electrical power if the DC output voltage exceeds a predetermined value.

41. A power supply system, particularly adapted for converting AC electrical power into DC electrical power for supply to one or more power consuming devices, said system comprising:

a frame;

circuit means supported on said frame including means for connecting said power supply system to a source of AC electrical power;

at least one shelf means supported on said frame including plural slots thereon and operable to removably support plural AC to DC rectifier units whereby each of said rectifier units may be selectively positioned on said shelf means and removed from said shelf means, at will;

connector means on said shelf means for connecting said rectifier units, respectively, to a bus, a ground plate and to said source of AC electrical power, said bus and said ground plate being supported on said frame;

circuit breakers mounted on said frame and operable to be connected to said bus and including means for connecting said rectifier units to plural DC electrical loads, and rectifier controller means associated with each of said rectifier units for controlling the DC output voltage of each of said rectifier units, respectively, to maintain a predetermined voltage on said bus, said rectifier controller means including mean for sensing a current output of said rectifier units, respectively, and said rectifier controller means including a microcontroller device, a digital to analog converter circuit and an analog to digital signal converter circuit operably connected to said microcontroller device, respectively, buffer means interconnecting a DC voltage control circuit with said digital to analog converter circuit and a current sensor operably connected to said analog to digital converter circuit.

42. The power supply system set forth in claim 41 including:

a master controller including a microcontroller unit operably connected to each of said rectifier controller means and operable to control the DC output voltage of each of said rectifier units through said rectifier controller means, respectively.

43. The power supply system set forth in claim 42 including:

indicator circuit means associated with said circuit breakers for indicating if said circuit breakers are in an open or closed condition, respectively, said indicator circuit means being connected to said master controller for indicating to said master controller which of said circuit breakers is in an open condition.

44. A power supply system, particularly adapted for converting AC electrical power into DC electrical power for one or more power consuming devices, said system comprising:

a frame;

a current conducting bus supported on said frame and a current conducting ground plate supported on said frame;

removable shelf means supported on said frame including plural slots thereon operable to support plural AC to DC rectifier units whereby each of said rectifier units may be selectively positioned on said shelf means and removed from said shelf means at will;

first connector means mounted on said shelf means at each of said slots for connecting said rectifier units, respectively, to said bus and said ground plate and to a source of AC electrical power;

second connector means supported on said shelf means and said frame and operable to provide a current conducting path between said bus and said rectifier units and between said ground plate and said rectifier units, respectively; and rectifier controller means associated with each of said rectifier units and supported on said shelf means for controlling the DC output voltage of each of said rectifier units, respectively, said rectifier controller means including a microcontroller device, a digital to analog converter circuit and an analog to digital converter circuit operably connected to said microcontroller device, respectively, buffer means interconnecting a DC voltage control circuit with said digital to analog converter circuit and a current sensor operably connected to said analog to digital converter circuit.

45. The power supply system set forth in claim 44 including:

a master controller including a microcontroller unit operably connected to each of said rectifier controller means and operable to control the DC output voltage of each of said rectifier units through said rectifier controller means, respectively.

46. The power supply system set forth in claim 44 including:

a circuit backplane mounted on said shelf means and interconnecting each of said rectifier controller means with said master controller.

47. In a power supply system, particularly adapted for converting AC electrical power into DC electrical power to supply a plurality of power consuming devices, said system including a plurality of AC to DC rectifier units operable to be connected to a common current conducting bus, a control system for said power supply system comprising:

rectifier controller means associated with each of said rectifier units for controlling the DC output voltage of each of said rectifier units, respectively, to maintain a predetermined voltage on said bus, said rectifier controller means each including a microcontroller device, a digital to analog converter circuit and an analog to digital converter circuit operably connected to said microcontroller device, respectively, buffer means interconnecting a DC voltage control circuit with said digital to analog converter circuit and a current sensor operably connected to said analog to digital converter circuit; and a master controller including a microcontroller unit operably connected to each of said rectifier controller means and operable to control the DC output voltage of each of said rectifier units through said rectifier controller means, respectively.

48. In a power supply system for supplying DC electrical power to a plurality of power consuming devices, said power supply system including a plurality of AC to DC rectifier units operable to be connected to a source of AC electrical power and to a common bus on said power supply system and a battery bank operable to be connected to said bus for supplying DC electrical power directly through said bus to said power consuming devices, and a master controller including a digital processing unit, a memory circuit, and an interface between said controller and each of said rectifier units, the method of operating said power supply system comprising the steps of:

monitoring the DC voltage on said bus and comparing said voltage on said bus to a predetermined DC output voltage of said power supply system;

causing selected ones of said rectifier units to supply DC electrical power to said bus in accordance with said voltage on said bus;

sensing the DC output voltage of each of said rectifier units and causing a rectifier unit to cease supplying electrical power to said bus if said rectifier unit is supplying power to said bus at a voltage above a predetermined voltage;

monitoring the DC current output of each of said rectifier units;

causing selected ones of said rectifier units to start supplying DC electrical power to said bus while monitoring the DC output voltage of said selected rectifier units; and causing at least one of said rectifier units to cease supplying electrical power to said bus if the DC output voltage of said at least one rectifier unit exceeds a predetermined maximum voltage after a predetermined number of starts of said at least one rectifier unit.

49. In a power supply system for supplying DC electrical power to a plurality of power consuming devices, said power supply system including a plurality of AC to DC rectifier units operable to be connected to a source of AC electrical power and to a common bus on said power supply system and a battery bank operable to be connected to said bus for supplying DC electrical power directly through said bus to said power consuming devices, and a master controller including a digital processing unit, a memory circuit, and an interface between said controller and each of said rectifier units, the method of operating said power supply system comprising the steps of:

monitoring the DC voltage on said bus and comparing said voltage on said bus to a predetermined DC output voltage of said power supply system;

causing selected ones of said rectifier units to supply DC electrical power to said bus in accordance with said voltage on said bus;

sensing the DC output voltage of each of said rectifier units and causing a rectifier unit to cease supplying electrical power to said bus if said rectifier unit is supplying power to said bus at a voltage above a predetermined voltage;

monitoring the DC current output of each of said rectifier units; and causing each of said rectifier units to begin supplying DC electrical power to said bus at different predetermined times on starting or restarting the supply of DC electrical power to said power consuming devices to cause the DC current on said bus to progressively increase from a minimum to a predetermined maximum value.

* * * * *